US009229454B1

(12) United States Patent
Chiappetta et al.

(10) Patent No.: US 9,229,454 B1
(45) Date of Patent: Jan. 5, 2016

(54) AUTONOMOUS MOBILE ROBOT SYSTEM

(71) Applicant: iRobot Corporation, Bedford, MA (US)

(72) Inventors: Mark J. Chiappetta, Chelmsford, MA (US); James Paul Frankel, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 75 days.

(21) Appl. No.: 14/044,346

(22) Filed: Oct. 2, 2013

Related U.S. Application Data

(63) Continuation of application No. 13/299,982, filed on Nov. 18, 2011, now Pat. No. 8,874,264, and a continuation of application No. 12/415,512, filed on Mar. 31, 2009, now Pat. No. 8,634,956, and a continuation of application No. 11/176,048, filed on Jul. 7, 2005, now Pat. No. 7,706,917.

(60) Provisional application No. 60/586,046, filed on Jul. 7, 2004.

(51) Int. Cl.
*G06F 19/00* (2011.01)
*G05D 1/02* (2006.01)

(52) U.S. Cl.
CPC .............. *G05D 1/0246* (2013.01); *Y10S 901/01* (2013.01)

(58) Field of Classification Search
USPC ......................................................... 700/245
See application file for complete search history.

(56) References Cited

U.S. PATENT DOCUMENTS

| 1,755,054 | A | 4/1930 | Darst |
| 1,780,221 | A | 11/1930 | Buchmann |
| 1,970,302 | A | 8/1934 | Gerhardt |
| 2,136,324 | A | 11/1938 | John |
| 2,302,111 | A | 11/1942 | Dow et al. |
| 2,353,621 | A | 7/1944 | Sav et al. |
| 2,770,825 | A | 11/1956 | Pullen |
| 2,930,055 | A | 3/1960 | Fallen et al. |
| 3,119,369 | A | 1/1964 | Harland et al. |
| 3,166,138 | A | 1/1965 | Dunn |
| 3,333,564 | A | 8/1967 | Waters |
| 3,375,375 | A | 3/1968 | Robert et al. |
| 3,381,652 | A | 5/1968 | Schaefer et al. |

(Continued)

FOREIGN PATENT DOCUMENTS

| DE | 2128842 C3 | 12/1980 |
| DE | 3317376 C2 | 12/1987 |

(Continued)

OTHER PUBLICATIONS

Andersen et al., "Landmark based navigation strategies," SPIE Conference on Mobile Robots XIII, SPIE vol. 3525, pp. 170-181, Jan. 8, 1999.

(Continued)

*Primary Examiner* — Bhavesh V Amin
(74) *Attorney, Agent, or Firm* — Fish & Richardson P.C.

(57) ABSTRACT

A navigational control system for an autonomous robot includes a transmitter subsystem having a stationary emitter for emitting at least one signal. An autonomous robot operating within a working area utilizes a receiving subsystem to detect the emitted signal. The receiver subsystem has a receiver for detecting the emitted signal emitted by the emitter and a processor for determining a relative location of the robot within the working area upon the receiver detecting the signal.

18 Claims, 19 Drawing Sheets

(56) References Cited

U.S. PATENT DOCUMENTS

| | | |
|---|---|---|
| 3,457,575 A | 7/1969 | Bienek |
| 3,550,714 A | 12/1970 | Bellinger |
| 3,569,727 A | 3/1971 | Aggarwal et al. |
| 3,649,981 A | 3/1972 | Woodworth |
| 3,674,316 A | 7/1972 | De Bray |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De bray |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,584,704 A | 4/1986 | Ferren |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,453 A | 12/1986 | Kamejima et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,773 A | 12/1987 | Clement et al. |
| 4,710,020 A | 12/1987 | Maddox et al. |
| 4,712,740 A | 12/1987 | Duncan et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,862,047 A | 8/1989 | Suzuki et al. |
| 4,867,570 A | 9/1989 | Sorimachi et al. |
| 4,868,752 A | 9/1989 | Fujii et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,918,607 A | 4/1990 | Wible |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,947,094 A | 8/1990 | Dyer et al. |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |

(56) References Cited

U.S. PATENT DOCUMENTS

| | | |
|---|---|---|
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,154,617 A | 10/1992 | Suman et al. |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,525,883 A | 6/1996 | Avitzour |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Wörwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,722,109 A | 3/1998 | Delmas et al. |

(56) References Cited

U.S. PATENT DOCUMENTS

| | | |
|---|---|---|
| 5,732,401 A | 3/1998 | Conway |
| 5,735,017 A | 4/1998 | Barnes et al. |
| 5,735,959 A | 4/1998 | Kubo et al. |
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,770,936 A | 6/1998 | Hirai et al. |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,784,755 A | 7/1998 | Karr et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,802,665 A | 9/1998 | Knowlton et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,836,045 A | 11/1998 | Anthony et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,867,861 A | 2/1999 | Kasen et al. |
| 5,869,910 A | 2/1999 | Colens |
| 5,894,621 A | 4/1999 | Kubo |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,911,767 A | 6/1999 | Garibotto et al. |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,935,333 A | 8/1999 | Davis |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,009,359 A | 12/1999 | El-Hakim et al. |
| 6,012,618 A | 1/2000 | Matsuo et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,327 A | 3/2000 | Oka et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,050,648 A | 4/2000 | Keleny |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,070,290 A | 6/2000 | Schwarze et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |

(56) References Cited

U.S. PATENT DOCUMENTS

| | | |
|---|---|---|
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,279,196 B2 | 8/2001 | Kasen et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,286,181 B1 | 9/2001 | Kasper et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B2 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,677,938 B1 | 1/2004 | Maynard |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |

(56) References Cited

U.S. PATENT DOCUMENTS

| | | |
|---|---|---|
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,041,029 B2 | 5/2006 | Fulghum et al. |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 | 7/2010 | Ziegler et al. |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 | 11/2010 | Harwig et al. |
| 7,849,555 B2 | 12/2010 | Hahm et al. |
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,957,836 B2 | 6/2011 | Myeong et al. |
| 8,087,117 B2 | 1/2012 | Kapoor et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |

(56) References Cited

U.S. PATENT DOCUMENTS

| | | |
|---|---|---|
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0015232 A1 | 1/2003 | Nguyen |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0081782 A1 | 4/2005 | Buckley et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0009879 A1 | 1/2006 | Lynch et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |

(56) References Cited

U.S. PATENT DOCUMENTS

| | | |
|---|---|---|
| 2006/0089765 A1 | 4/2006 | Pack et al. |
| 2006/0100741 A1 | 5/2006 | Jung |
| 2006/0107894 A1 | 5/2006 | Buckley et al. |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0150361 A1 | 7/2006 | Aldred et al. |
| 2006/0184293 A1 | 8/2006 | Konandreas et al. |
| 2006/0185690 A1 | 8/2006 | Song et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0200281 A1 | 9/2006 | Ziegler et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0016328 A1 | 1/2007 | Ziegler et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061043 A1 | 3/2007 | Ermakov et al. |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 102004038074 | 6/2005 |
| DE | 10357636 | 7/2005 |
| DE | 102004041021 B3 | 8/2005 |
| DE | 102005046813 A1 | 4/2007 |
| DK | 338988 A | 12/1988 |
| EP | 0265542 A1 | 5/1988 |
| EP | 0281085 A2 | 9/1988 |
| EP | 0286328 A1 | 10/1988 |
| EP | 0294101 A2 | 12/1988 |
| EP | 0352045 A2 | 1/1990 |
| EP | 0433697 A2 | 6/1991 |
| EP | 0437024 A1 | 7/1991 |
| EP | 0554978 A2 | 8/1993 |
| EP | 0615719 A1 | 9/1994 |
| EP | 0792726 A1 | 9/1997 |
| EP | 0930040 A2 | 7/1999 |
| EP | 0845237 B1 | 4/2000 |
| EP | 0861629 B1 | 9/2001 |
| EP | 1228734 A2164 | 8/2002 |
| EP | 1380245 A1 | 1/2004 |
| EP | 1380246 A2 | 1/2004 |
| EP | 1018315 B1 | 11/2004 |
| EP | 1553472 A1 | 7/2005 |
| EP | 1557730 A1 | 7/2005 |
| EP | 1642522 A2 | 4/2006 |
| EP | 1836941 A2 | 9/2007 |
| ES | 2238196 A1 | 8/2005 |
| FR | 722755 | 3/1932 |
| FR | 2601443 A1 | 1/1988 |
| FR | 2828589 A1 | 2/2003 |
| GB | 702426 | 1/1954 |
| GB | 2128842 A | 5/1984 |
| GB | 2213047 | 8/1989 |
| GB | 2225221 A | 5/1990 |
| GB | 2267360 A | 12/1993 |
| GB | 2283838 A | 5/1995 |
| GB | 2284957 A | 6/1995 |
| GB | 2300082 A | 10/1996 |
| GB | 2344747 A | 6/2000 |
| GB | 2404330 A | 2/2005 |
| GB | 2417354 A | 2/2006 |
| JP | 53021869 | 2/1978 |
| JP | 53110257 A2 | 9/1978 |
| JP | 57014726 | 1/1982 |
| JP | 57064217 | 4/1982 |
| JP | 59005315 | 1/1984 |
| JP | 59033511 U | 3/1984 |
| JP | 59094005 | 5/1984 |
| JP | 59099308 | 6/1984 |
| JP | 59112311 | 6/1984 |
| JP | 59120124 A | 7/1984 |
| JP | 59131668 U | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61023221 | 1/1986 |
| JP | 61097712 A | 5/1986 |
| JP | 61160366 | 7/1986 |
| JP | 62070709 | 4/1987 |
| JP | 62074018 A | 4/1987 |

(56) References Cited

FOREIGN PATENT DOCUMENTS

| | | |
|---|---|---|
| JP | 62120510 A | 6/1987 |
| JP | 62154008 | 7/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63158032 | 7/1988 |
| JP | 63203483 A | 8/1988 |
| JP | 63241610 A | 10/1988 |
| JP | 1118752 | 8/1989 |
| JP | 2-6312 | 1/1990 |
| JP | 3051023 A | 3/1991 |
| JP | 4019586 | 1/1992 |
| JP | 4074285 A | 3/1992 |
| JP | 4084921 A | 3/1992 |
| JP | 5023269 A | 2/1993 |
| JP | 5042076 A | 2/1993 |
| JP | 05046239 | 2/1993 |
| JP | 5046246 | 2/1993 |
| JP | 5091604 | 4/1993 |
| JP | 5091604 A | 4/1993 |
| JP | 5095879 A | 4/1993 |
| JP | 5150827 A | 6/1993 |
| JP | 5150829 A | 6/1993 |
| JP | 5054620 | 7/1993 |
| JP | 5040519 Y2 | 10/1993 |
| JP | 05257527 A | 10/1993 |
| JP | 5257533 | 10/1993 |
| JP | 05285861 A | 11/1993 |
| JP | 5302836 A | 11/1993 |
| JP | 5312514 A | 11/1993 |
| JP | 5341904 A | 12/1993 |
| JP | 6003251 U | 1/1994 |
| JP | 6038912 | 2/1994 |
| JP | 6105781 A | 4/1994 |
| JP | 6137828 A | 5/1994 |
| JP | 6154143 A | 6/1994 |
| JP | 6293095 A | 10/1994 |
| JP | 06327598 A | 11/1994 |
| JP | 7047046 A | 2/1995 |
| JP | 07129239 A | 5/1995 |
| JP | 7059702 B | 6/1995 |
| JP | 07222705 | 8/1995 |
| JP | 7270518 A | 10/1995 |
| JP | 7281742 | 10/1995 |
| JP | 7311041 | 11/1995 |
| JP | 7313417 A | 12/1995 |
| JP | 7319542 | 12/1995 |
| JP | 8000393 A | 1/1996 |
| JP | 8016241 | 1/1996 |
| JP | 8016776 A | 1/1996 |
| JP | 8063229 | 3/1996 |
| JP | 8083125 | 3/1996 |
| JP | 8084696 A | 4/1996 |
| JP | 8089449 A | 4/1996 |
| JP | 08089451 A | 4/1996 |
| JP | 2520732 | 5/1996 |
| JP | 8123548 A | 5/1996 |
| JP | 8152916 A | 6/1996 |
| JP | 8256960 | 10/1996 |
| JP | 8263137 A | 10/1996 |
| JP | 8286741 | 11/1996 |
| JP | 8286744 | 11/1996 |
| JP | 8322774 | 12/1996 |
| JP | 8335112 A | 12/1996 |
| JP | 8339297 A | 12/1996 |
| JP | 943901 | 2/1997 |
| JP | 9044240 A | 2/1997 |
| JP | 9066855 A | 3/1997 |
| JP | 9145309 A | 6/1997 |
| JP | 09160644 | 6/1997 |
| JP | 09179625 A | 7/1997 |
| JP | 9179685 | 7/1997 |
| JP | 09185410 | 7/1997 |
| JP | 9192069 A | 7/1997 |
| JP | 2555263 Y2 | 8/1997 |
| JP | 9204223 A | 8/1997 |
| JP | 09206258 A | 8/1997 |
| JP | 09233712 | 9/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10118963 A | 5/1998 |
| JP | 10165738 A | 6/1998 |
| JP | 10177414 A | 6/1998 |
| JP | 10214114 | 8/1998 |
| JP | 10228316 | 8/1998 |
| JP | 10240342 | 9/1998 |
| JP | 10268727 | 9/1998 |
| JP | 10295595 A | 11/1998 |
| JP | 10314088 | 12/1998 |
| JP | 11015941 A | 1/1999 |
| JP | 11065655 | 3/1999 |
| JP | 11085269 | 3/1999 |
| JP | 11102219 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11178764 | 7/1999 |
| JP | 11178765 | 7/1999 |
| JP | 11212642 | 8/1999 |
| JP | 11213157 A | 8/1999 |
| JP | 11508810 | 8/1999 |
| JP | 11510935 | 9/1999 |
| JP | 11282532 | 10/1999 |
| JP | 11282533 | 10/1999 |
| JP | 11295412 A | 10/1999 |
| JP | 11346964 | 12/1999 |
| JP | 2000047728 | 2/2000 |
| JP | 2000056006 A | 2/2000 |
| JP | 2000056831 A | 2/2000 |
| JP | 2000060782 A | 2/2000 |
| JP | 2000066722 A | 3/2000 |
| JP | 2000075925 A | 3/2000 |
| JP | 2000102499 A | 4/2000 |
| JP | 10240343 | 5/2000 |
| JP | 2000275321 | 10/2000 |
| JP | 2000279353 A | 10/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001121455 | 5/2001 |
| JP | 2001125641 | 5/2001 |
| JP | 2001508572 A | 6/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001275908 A | 10/2001 |
| JP | 2001289939 | 10/2001 |
| JP | 2001306170 A | 11/2001 |
| JP | 2001525567 | 12/2001 |
| JP | 2002073170 A | 3/2002 |
| JP | 2002078650 A | 3/2002 |
| JP | 2002204768 A | 7/2002 |
| JP | 2002204769 A | 7/2002 |
| JP | 2002247510 A | 8/2002 |
| JP | 2002532178 | 10/2002 |
| JP | 2002532180 A | 10/2002 |
| JP | 2002323925 | 11/2002 |
| JP | 2002333920 A | 11/2002 |
| JP | 03356170 | 12/2002 |
| JP | 2002355206 | 12/2002 |

(56) References Cited

FOREIGN PATENT DOCUMENTS

| | | |
|---|---|---|
| JP | 2002360471 A | 12/2002 |
| JP | 2002360482 A | 12/2002 |
| JP | 2002366227 | 12/2002 |
| JP | 2002369778 | 12/2002 |
| JP | 2003005296 A | 1/2003 |
| JP | 2003010076 A | 1/2003 |
| JP | 2003010088 A | 1/2003 |
| JP | 2003028528 A | 1/2003 |
| JP | 03375843 | 2/2003 |
| JP | 2003036116 A | 2/2003 |
| JP | 2003038401 A | 2/2003 |
| JP | 2003038402 A | 2/2003 |
| JP | 2003047579 | 2/2003 |
| JP | 2003505127 | 2/2003 |
| JP | 2003061882 A | 3/2003 |
| JP | 2003084994 | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003241836 A | 8/2003 |
| JP | 2003262520 A | 9/2003 |
| JP | 2003304992 A | 10/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004198330 A | 7/2004 |
| JP | 2004219185 | 8/2004 |
| JP | 2004351234 A | 12/2004 |
| JP | 2005118354 A | 5/2005 |
| JP | 2005211360 A | 8/2005 |
| JP | 2005224265 A | 8/2005 |
| JP | 2005082223 | 9/2005 |
| JP | 2005230032 A | 9/2005 |
| JP | 2005245916 A | 9/2005 |
| JP | 2005346700 | 12/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 2009015611 A | 1/2009 |
| JP | 2010198552 A | 9/2010 |
| WO | 9526512 A1 | 10/1995 |
| WO | 9530887 A1 | 11/1995 |
| WO | 9617258 A1 | 6/1996 |
| WO | 9715224 A1 | 5/1997 |
| WO | 9740734 A1 | 11/1997 |
| WO | 9741451 A1 | 11/1997 |
| WO | 9853456 A1 | 11/1998 |
| WO | 9905580 A2 | 2/1999 |
| WO | 9916078 A1 | 4/1999 |
| WO | 9938056 A1 | 7/1999 |
| WO | 9938237 A1 | 7/1999 |
| WO | 9943250 A1 | 9/1999 |
| WO | 0038026 A1 | 6/2000 |
| WO | 0038028 A1 | 6/2000 |
| WO | 0038029 A1 | 6/2000 |
| WO | 0004430 A1 | 10/2000 |
| WO | 0078410 A1 | 12/2000 |
| WO | 0106904 A1 | 2/2001 |
| WO | 0106905 A1 | 2/2001 |
| WO | 0180703 A1 | 11/2001 |
| WO | 0191623 A2 | 12/2001 |
| WO | 0224292 A1 | 3/2002 |
| WO | 0239864 A1 | 5/2002 |
| WO | 0239868 A1 | 5/2002 |
| WO | 02058527 A1 | 8/2002 |
| WO | 02062194 A1 | 8/2002 |
| WO | 02067744 A1 | 9/2002 |
| WO | 02067745 A1 | 9/2002 |
| WO | 02067752 A1 | 9/2002 |
| WO | 02069774 A1 | 9/2002 |
| WO | 02069775 A2 | 9/2002 |
| WO | 02071175 A1 | 9/2002 |
| WO | 02074150 A1 | 9/2002 |
| WO | 02075350 A1 | 9/2002 |
| WO | 02075356 A1 | 9/2002 |
| WO | 02075469 A1 | 9/2002 |
| WO | 02075470 A1 | 9/2002 |
| WO | 02081074 A1 | 10/2002 |
| WO | 02101477 A2 | 12/2002 |
| WO | 03015220 A1 | 2/2003 |
| WO | 03024292 A2 | 3/2003 |
| WO | 03040546 A1 | 5/2003 |
| WO | 03040845 A1 | 5/2003 |
| WO | 03040846 A1 | 5/2003 |
| WO | 03062850 A2 | 7/2003 |
| WO | 03062852 A1 | 7/2003 |
| WO | 2004004533 A1 | 1/2004 |
| WO | 2004004534 A1 | 1/2004 |
| WO | 2004006034 A2 | 1/2004 |
| WO | 2004025947 A2 | 3/2004 |
| WO | 2004058028 A2 | 7/2004 |
| WO | 2004059409 A1 | 7/2004 |
| WO | 2005006935 A1 | 1/2005 |
| WO | 2005037496 A1 | 4/2005 |
| WO | 2005055795 A1 | 6/2005 |
| WO | 2005055796 A2 | 6/2005 |
| WO | 2005076545 A1 | 8/2005 |
| WO | 2005077243 A1 | 8/2005 |
| WO | 2005077244 A1 | 8/2005 |
| WO | 2005081074 A1 | 9/2005 |
| WO | 2005083541 A1 | 9/2005 |
| WO | 2005098475 A1 | 10/2005 |
| WO | 2005098476 A1 | 10/2005 |
| WO | 2006046400 A1 | 5/2006 |
| WO | 2006061133 A1 | 6/2006 |
| WO | 2006068403 A1 | 6/2006 |
| WO | 2006073248 A1 | 7/2006 |
| WO | 2006089307 A2 | 8/2006 |
| WO | 2007028049 A2 | 3/2007 |
| WO | 2007036490 A2 | 4/2007 |
| WO | 2007065033 A2 | 6/2007 |
| WO | 2007137234 A2 | 11/2007 |

OTHER PUBLICATIONS

Ascii, Mar. 25, 2002, http://ascii.jp/elem/000/000/330/330024/, accessed Nov. 2011, 7 pages.
Barker, "Navigation by the Stars—Ben Barker 4th Year Project," Nov. 2004, 20 pages.
Becker et al., Reliable Navigation Using Landmarks, IEEE International Conference on Robotics and Automation, 0-7803-1965-6, pp. 401-406, 1995.
Benayad-Cherif et al., "Mobile Robot Navigation Sensors," SPIE vol. 1831 Mobile Robots, VII, pp. 378-387, 1992.
Betke et al. "Mobile robot localization using landmarks," Proceedings of the IEEE/RSJ/GI International Conference on Intelligent Robots and Systems '94 Advanced Robotic Systems and the Real World (IROS '94), Accessed via IEEE Xplore, 1994, 8 pages.
Bison et al., "Using a structured beacon for cooperative position estimation," *Robotics and Autonomous Systems*, 29(1):33-40, Oct. 1999.
Blaasvaer et al., "AMOR—An Autonomous Mobile Robot Navigation System," Proceedings of the IEEE International Conference on Systems, Man, and Cybernetics, pp. 2266-2271, 1994.
Borges et al., "Optimal Mobile Robot Pose Estimation Using Geometrical Maps," IEEE Transactions on Robotics and Automation, 18(1): 87-94, Feb. 2002.
Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.

(56) References Cited

OTHER PUBLICATIONS

Bulusu et al., "Self Configuring Localization systems: Design and Experimental Evaluation,"*ACM Transactions on Embedded Computing Systems*, 3(1):24-60, 2003.

Caccia et al., "Bottom-Following for Remotely Operated Vehicles,"5th IFAC Conference, Alaborg, Denmark, pp. 245-250, Aug. 2000.

U.S. Appl. No. 60/605,066 as provided to WIPO in PCT/US2005/030422, corresponding to U.S. National Stage Entry U.S. Appl. No. 11/574,290, U.S.publication 2008/0184518, filed Aug. 27, 2004.

U.S. Appl. No. 60/605,181 as provided to WIPO in PCT/US2005/030422, corresponding to U.S. National Stage Entry U.S. Appl. No. 11/574,290, U.S.publication 2008/0184518, filed Aug. 27, 2004.

Chae et al., "StarLITE: A new artificial landmark for the navigation of mobile robots," http://www.irc.atr.jp/jk-nrs2005/pdf/Starlite.pdf, 4 pages, 2005.

Chamberlin et al., "Team 1: Robot Locator Beacon System, " NASA Goddard SFC, Design Proposal, 15 pages, Feb. 2006.

Champy, "Physical management of IT assets in Data Centers using RFID technologies," RFID 2005 University, Oct. 12-14, 2005 , 19 pages.

Chiri, "Joystick Control for Tiny OS Robot," http://www.eecs.berkeley.edu/Programs/ugrad/superb/papers2002/chiri.pdf. 12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.

Clerentin et al., "A localization method based on two omnidirectional perception systems cooperation," *Proc of IEEE International Conference on Robotics & Automation*, San Francisco, CA vol. 2, pp. 1219-1224, Apr. 2000.

Corke, "High Performance Visual serving for robots end-point control," SPIE vol. 2056, Intelligent Robots and Computer Vision, 1993, 10 pages.

Cozman et al., "Robot Localization using a Computer Vision Sextant," IEEE International Midwest Conference on Robotics and Automation, pp. 106-111, 1995.

D'Orazio et al., "Model based Vision System for mobile robot position estimation", *SPIE*, vol. 2058 Mobile Robots VIII, pp. 38-49, 1992.

De Bakker et al., "Smart PSD—array for sheet of light range imaging", Proc. of *SPIE*, vol. 3965, pp. 1-12, May 2000.

Desaulniers et al., "An Efficient Algorithm to find a shortest path for a car-like Robot," *IEEE Transactions on robotics and Automation* , 11(6):819-828, Dec. 1995.

Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.

Dorsch et al., "Laser Triangulation: Fundamental uncertainty in distance measurement," *Applied Optics*, 33(7):1306-1314, Mar. 1994.

Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.

Dudek et al., "Localizing a Robot with Minimum Travel" *Proceedings of the sixth annual ACM-SIAM symposium on Discrete Algorithms*, 27(2):583-604, Apr. 1998.

Dulimarta et al., "Mobile Robot Localization in Indoor Environment", *Pattern Recognition*, 30(1):99-111, 1997.

Dyson's Robot Vacuum Cleaner—the DC06, May 2004, Retrieved from the Internet: URL< http://www.gizmag.com/go/1282/>. Accessed Nov. 2011, 3 pages.

EBay, "Roomba Timer—> Timed Cleaning—Floorvac Robotic Vacuum," Retrieved from the Internet: URL Cgi.ebay.com/ws/eBaylSAPl.dll?viewitem&category=43526&item=4375198387&rd=1, 5 pages, Apr. 2005.

Electrolux Trilobite, Jan. 12, 2001, http://www.electroluxui.com:8080/2002%5C822%5C833102EN.pdf, accessed Jul. 2, 2012, 10 pages.

Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.

Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.

Euroflex Intelligente Monstre, (English excerpt only), 2006, 15 pages.

Euroflex, Jan. 2006, Retrieved from the Internet: URL< http://www.euroflex.tv/novita_dett.php?id=15, accessed Nov. 2011, 1 page.

Everyday Robots, "Everyday Robots: Reviews, Discussion and News for Consumers," Aug. 2004, Retrieved from the Internet: URL< www.everydayrobots.com/index.php?option=content&task=view&id=9> (Sep. 2012), 4 pages.

Evolution Robotics, "NorthStar—Low-cost Indoor Localiztion—How it Works," E Evolution Robotics , 2 pages, 2005.

Facchinetti Claudio et al., "Self-Positioning Robot Navigation Using Ceiling Images Sequences," ACCV '95, 5 pages, Dec. 1995.

Facchinetti Claudio et al., "Using and Learning Vision-Based Self-Positioning for Autonomous Robot Navigation," ICARCV '94, vol. 3, pp. 1694-1698, 1994.

Fairfield et al., "Mobile Robot Localization with Sparse Landmarks," SPIE vol. 4573, pp. 148-155, 2002.

Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.

Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.

Floorbotics, VR8 Floor Cleaning Robot, Product Description for Manufacturing, URL: <http://www.consensus.sem.au/SoftwareAwards/CSAarchive/CSA2004/CSAart04/FloorBot/F>. Mar. 2004, 11 pages.

Franz et al., "Biomimetric robot navigation", Robotics and Autonomous Systems, vol. 30 pp. 133-153, 2000.

Fuentes et al., "Mobile Robotics 1994," University of Rochester. Computer Science Department, TR 588, 44 pages, Dec. 1994.

Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466/1471, Aug. 1995.

Gat, "Robust Low-Computation Sensor-driven Control for Task-Directed Navigation," Proc of IEEE International Conference on Robotics and Automation , Sacramento, CA pp. 2484-2489, Apr. 1991.

Gionis, "A hand-held optical surface scanner for environmental Modeling and Virtual Reality," Virtual Reality World, 16 pages, 1996.

Goncalves et al., "A Visual Front-End for Simultaneous Localization and Mapping", Proceedings of the 2005 IEEE International Conference on Robotics and Automation, Barcelona, Spain, pp. 44-49, Apr. 2005.

Gregg et al., "Autonomous Lawn Care Applications," 2006 Florida Conference on Recent Advances in Robotics, Miami, Florida, May 25-26, 2006, Florida International University, 5 pages.

Grumet, "Robots Clean House," Popular Mechanics, Nov. 2003, 3 pages.

Hamamatsu "SI PIN Diode S5980, S5981 S5870—Multi-element photodiodes for surface mounting," Hamatsu Photonics, 2 pages, Apr. 2004.

Hammacher Schlemmer , "Electrolux Trilobite Robotic Vacuum," Retrieved from the Internet: URL< www.hammacher.com/publish/71579.asp?promo=xsells>. 3 pages, Mar. 2005.

Haralick et al. "Pose Estimation from Corresponding Point Data", *IEEE Transactions on Systems, Man, and Cybernetics*, 19(6):1426-1446, Nov. 1989.

(56) References Cited

OTHER PUBLICATIONS

Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.

Hitachi, http://www.hitachi.co.jp/New/cnews/hi_030529_hi_030529.pdf , 8 pages, May 29, 2003.

Hoag et al., "Navigation and Guidance in interstellar space," ACTA Astronautica, vol. 2, pp. 513-533 , Feb. 1975.

Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.

InMach "Intelligent Machines," Retrieved from the Internet: URL<www.inmach.de/inside.html>. 1 page , Nov. 2008.

Innovation First, "2004 EDU Robot Controller Reference Guide," Retrieved from the Internet: URL<http://www.ifirobotics.com>. 13 pages, Mar. 2004.

Jarosiewicz et al., "Final Report—Lucid," University of Florida, Departmetn of Electrical and Computer Engineering, EEL 5666—Intelligent Machine Design Laboratory, 50 pages, Aug. 1999.

Jensfelt et al., "Active Global Localization for a mobile robot using multiple hypothesis tracking," *IEEE Transactions on Robots and Automation*, 17(5): 748-760, Oct. 2001.

Jeong et al., "An intelligent map-building system for indoor mobile robot using low cost photo sensors," *SPIE*, vol. 6042, 6 pages, 2005.

Kahney, "Robot Vacs are in the House," Retrieved from the Internet: URL<www.wired.com/news/technology/o,1282,59237,00.html>. 6 pages, Jun. 2003.

Karcher "Karcher RoboCleaner RC 3000," Retrieved from the Internet: URL<www.robocleaner.de/english/screen3.html>. 4 pages, Dec. 2003.

Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.

Karcher, "Product Manual Download Karch", available at www.karcher.com, 16 pages, 2004.

Karlsson et al, "Core Technologies for service Robotics," IEEE/RSJ International Conference on Intelligent Robots and Systems (IROS 2004), vol. 3, pp. 2979-2984, Sep. 2004.

Karlsson et al., The vSLAM Algorithm for Robust Localization and Mapping, Proceedings of the 2005 IEEE International Conference on Robotics and Automation, Barcelona, Spain, pp. 24-29, Apr. 2005.

King and Weiman, "HelpmateTM Autonomous Mobile Robots Navigation Systems," SPIE vol. 1388 Mobile Robots, pp. 190-198, 1990.

Kleinberg, The Localization Problem for Mobile Robots, Laboratory for Computer Science, Massachusetts Institute of Technology, 1994 IEEE, pp. 521-531, 1994.

Knights, et al., "Localization and Identification of Visual Landmarks," *Journal of Computing Sciences in Colleges*, 16(4):312-313, May 2001.

Kolodko et al., "Experimental System for Real-Time Motion Estimation," Proceedings of the 2003 IEEE/ASME International Conference on Advanced Intelligent Mechatronics (AIM 2003), pp. 981-986, 2003.

Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.

KOOLVAC Robotic Vacuum Cleaner Owner's Manual, Koolatron, 2004, 13 pages.

Krotkov et al., "Digital Sextant," Downloaded from the internet at: http://www.cs.cmu.edu/~epk/ , 1 page, 1995.

Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.

Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.

Kurs et al, Wireless Power transfer via Strongly Coupled Magnetic Resonances, Downloaded from www.sciencemag.org, Aug. 2007, 5 pages.

Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.

Kwon et al., "Table Recognition through Range-based Candidate Generation and Vision based Candidate Evaluation," ICAR 2007, The 13th International Conference on Advanced Robotics Aug. 21-24, 2007, Jeju, Korea, pp. 918-923, 2007.

Lambrinos et al., "A mobile robot employing insect strategies for navigation," Retrieved from the Internat: URL<http://www8.cs.umu.se/kurser/TDBD17/VT04/d1/Assignment%20Papers/lambrinos-RAS-2000.pdf>. 38 pages, Feb. 1999.

Lang et al., "Visual Measurement of Orientation Using Ceiling Features", 1994 IEEE, pp. 552-555, 1994.

Lapin, "Adaptive position estimation for an automated guided vehicle," *SPIE*, vol. 1831 Mobile Robots VII, pp. 82-94, 1992.

LaValle et al., "Robot Motion Planning in a Changing, Partially Predictable Environment," 1994 IEEE International Symposium on Intelligent Control, Columbus, OH, pp. 261-266, Aug. 1994.

Lee et al., "Development of Indoor Navigation system for Humanoid Robot Using Multi-sensors Integration", ION NTM, San Diego, CA pp. 798-805, Jan. 2007.

Lee et al., "Localization of a Mobile Robot Using the Image of a Moving Object," *IEEE Transaction on Industrial Electronics*, 50(3):612-619, Jun. 2003.

Leonard et al., "Mobile Robot Localization by tracking Geometric Beacons," *IEEE Transaction on Robotics and Automation*, 7(3):376-382, Jun. 1991.

Li et al. "Robust Statistical Methods for Securing Wireless Localization in Sensor Networks," Information Processing in Sensor Networks, 2005, Fourth International Symposium on, pp. 91-98, Apr. 2005.

Li et al., "Making a Local Map of Indoor Environments by Swiveling a Camera and a Sonar," Proceedings of the 1999 IEEE/RSJ International Conference on Intelligent Robots and Systems, pp. 954-959, 1999.

Lin et al., "Mobile Robot Navigation Using Artificial Landmarks," *Journal of robotics System*, 14(2): 93-106, 1997.

Linde, Dissertation—"On Aspects of Indoor Localization," Available at: https://eldorado.tu-dortmund.de/handle/2003/22854, University of Dortmund, 138 pages, Aug. 2006.

Lumelsky et al., "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," IEEE, pp. 2359-2364, 2002.

Ma, Thesis—"Documentation on Northstar," California Institute of Technology, 14 pages, May 2006.

Madsen et al., "Optimal landmark selection for triangulation of robot position," Journal of Robotics and Autonomous Systems, vol. 13 pp. 277-292, 1998.

Malik et al., "Virtual Prototyping for Conceptual Design of a Tracked Mobile Robot," Electrical and Computer Engineering, Canadian Conference on, IEEE, PI. pp. 2349-2352, May 2006.

Martishevcky, "The Accuracy of point light target coordinate determination by dissectoral tracking system", SPIE vol. 2591, pp. 25-30, Oct. 23, 2005.

Maschinemarkt Würzburg 105, No. 27, pp. 3, 30, Jul. 5, 1999.

Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.

McGillem et al., "Infra-red Lacation System for Navigation and Autonomous Vehicles," 1988 IEEE International Conference on Robotics and Automation, vol. 2, pp. 1236-1238, Apr. 1988.

(56) References Cited

OTHER PUBLICATIONS

McGillem, et al. "A Beacon Navigation Method for Autonomous Vehicles," IEEE Transactions on Vehicular Technology, 38(3):132-139, Aug. 1989.

McLurkin "Stupid Robot Tricks: A Behavior-based Distributed Algorithm Library for Programming Swarms of Robots," Paper submitted for requirements of BSEE at MIT, May 2004, 127 pages.

McLurkin, "The Ants: A community of Microrobots," Paper submitted for requirements of BSEE at MIT, May 1995, 60 pages.

Michelson, "Autonomous navigation," McGraw-Hill—Access Science, Encyclopedia of Science and Technology Online, 2007, 4 pages.

Miro et al., "Towards Vision Based Navigation in Large Indoor Environments," Proceedings of the IEEE/RSJ International Conference on Intelligent Robots and Systems, Beijing, China, pp. 2096-2102, Oct. 2006.

Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, 2003.

MobileMag, "Samsung Unveils High-tech Robot Vacuum Cleaner," Retrieved from the Internet: URL<http://www.mobilemag.com/content/100/102/C2261/>. 4 pages, Mar. 2005.

Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.

Moore et al., "A simple Map-bases Localization strategy using range measurements," SPIE, vol. 5804 pp. 612-620, 2005.

Morland, "Autonomous Lawnmower Control", Downloaded from the internet at: http://cns.bu.edu/~cjmorlan/robotics/lawnmower/report.pdf, 10 pages, Jul. 2002.

Munich et al., "ERSP: A Software Platform and Architecture for the Service Robotics Industry," Intelligent Robots and Systems, 2005. (IROS 2005), pp. 460-467, Aug. 2005.

Munich et al., "SIFT-ing Through Features with ViPR", IEEE Robotics & Automation Magazine, pp. 72-77, Sep. 2006.

Nam et al., "Real-Time Dynamic Visual Tracking Using PSD Sensors and extended Trapezoidal Motion Planning", Applied Intelligence 10, pp. 53-70, 1999.

Nitu et al., "Optomechatronic System for Position Detection of a Mobile Mini-Robot," IEEE Ttransactions on Industrial Electronics, 52(4):969-973, Aug. 2005.

On Robo, "Robot Reviews Samsung Robot Vacuum (VC-RP30W)," Retrieved from the Internet: URL <www.onrobo.com/reviews/AT_Home/vacuum_cleaners/on00vcrb30rosam/index.htm>. 2 pages, 2005.

OnRobo "Samsung Unveils Its Multifunction Robot Vacuum," Retrieved from the Internet: URL <www.onrobo.com/enews/0210/samsung_vacuum.shtml>. 3 pages, Mar. 2005.

Pages et al., "A camera-projector system for robot positioning by visual serving," Proceedings of the 2006 Conference on Computer Vision and Pattern Recognition Workshop (CVPRW06), 8 pages, Jun. 2006.

Pages et al., "Optimizing Plane-to-Plane Positioning Tasks by Image-Based Visual Servoing and Structured Light," IEEE Transactions on Robotics, 22(5):1000-1010, Oct. 2006.

Pages et al., "Robust decoupled visual servoing based on structured light," 2005 IEEE/RSJ, Int. Conf. on Intelligent Robots and Systems, pp. 2676-2681, 2005.

Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun./Jul. 1994.

Park et al., "Dynamic Visual Servo Control of Robot Manipulators using Neutral Networks," The Korean Institute Telematics and Electronics, 29-B(10):771-779, Oct. 1992.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.

Paromtchik et al., "Optical Guidance System for Multiple mobile Robots," Proceedings 2001 ICRA. IEEE International Conference on Robotics and Automation, vol. 3, pp. 2935-2940, May 2001.

Penna et al., "Models for Map Building and Navigation", IEEE Transactions on Systems. Man. And Cybernetics., 23(5):1276-1301, Sep./Oct. 1993.

Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.

Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.

Pirjanian et al., "Distributed Control for a Modular, Reconfigurable Cliff Robot," Proceedings of the 2002 IEEE International Conference on Robotics & Automation, Washington, D.C. pp. 4083-4088, May 2002.

Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.

Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.

Pirjanian, "Challenges for Standards for consumer Robotics," IEEE Workshop on Advanced Robotics and its Social impacts, pp. 260-264, Jun. 2005.

Pirjanian, "Reliable Reaction," Proceedings of the 1996 IEEE/SICE/RSJ International Conference on Multisensor Fusion and Integration for Intelligent Systems, pp. 158-165, 1996.

Prassler et al., "A Short History of Cleaning Robots," Autonomous Robots 9, 211-226, 2000, 16 pages.

Remazeilles et al., "Image based robot navigation in 3D environments," Proc. of SPIE, vol. 6052, pp. 1-14, Dec. 2005.

Rives et al., "Visual servoing based on ellipse features," SPIE, vol. 2056 Intelligent Robots and Computer Vision pp. 356-367, 1993.

Roboking—not just a vacuum cleaner, a robot!, Jan. 21, 2004, infocom.uz/2004/01/21/robokingne-prosto-pyilesos-a-robot/, accessed Oct. 10, 2011, 5 pages.

Robotics World, "A Clean Sweep," 5 pages, Jan. 2001.

Ronnback, "On Methods for Assistive Mobile Robots," Retrieved from the Internet: URL<http://www.openthesis.org/documents/methods-assistive-mobile-robots-595019.html>. 218 pages, Jan. 2006.

Roth-Tabak et al., "Environment Model for mobile Robots Indoor Navigation," SPIE, vol. 1388 Mobile Robots, pp. 453-463, 1990.

Sahin et al., "Development of a Visual Object Localization Module for Mobile Robots," 1999 Third European Workshop on Advanced Mobile Robots, (Eurobot '99), pp. 65-72, 1999.

Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.

Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.

Schenker et al., "Lightweight rovers for Mars science exploration and sample return," Intelligent Robots and Computer Vision XVI, SPIE Proc. 3208, pp. 24-36, 1997.

Schofield, "Neither Master nor slave—A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.

(56) References Cited

OTHER PUBLICATIONS

Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Celluar Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt01.html, 1 page, accessed Nov. 1, 2011.
Takio et al., "Real-Time Position and Pose Tracking Method of Moving Object Using Visual Servo System," 47th IEEE International Symposium on Circuits and Systems, pp. 167-170, 2004.
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, 2004, Accessed at http://ww.totalvac.com/robot_vacuum.htm (Mar. 2005), 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.
Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.
Zhang et al., "A Novel Mobile Robot Localization Based on Vision," *SPIE* vol. 6279, 6 pages, Jan. 2007.
Written Opinion of the International Searching Authority, PCT/US2004/001504, dated Aug. 20, 2012, 9 pages.
Aly et al., "CompactKdt: Compact Signatures for Accurate Large Scale Object Recognition," IEEE Workshop on Applications of Computer Vision (WACV), IEEE, Jan. 9-11, 2012, Breckenridge, CO, pp. 505-512.
CleanMate 365, Intelligent Automatic Vacuum Cleaner, Model No. QQ-1, User Manual www.metapo.com/support/user_manual.pdf, Dec. 2005, 11 pages.
Denning Roboscrub image, 1989, 1 page.
Electrolux Trilobite, "Time to enjoy life," Retrieved from the Internet: URL<http://www.robocon.co.kr/trilobite/Presentation_Trilobite_Kor_030104.ppt, 10 pages, accessed Dec. 2011.
Electrolux, "Designed for the well-lived home," Retrieved from the Internet: URL<http://www.electroluxusa.com/node57.as[?currentURL=node142.asp%3F >. Accessed Mar. 2005, 2 pages.
eVac Robotic Vacuum S1727 Instruction Manual, Sharper Image Corp, Copyright 2004, 13 pages.
Facts on Trilobite, webpage, Retrieved from the Internet: URL < http://trilobiteelectroluxse/presskit_en/model11335asp?print=yes&pressID=>. 2 pages, accessed Dec. 2003.
Floorbot GE Plastics—Image, available at http://www.fuseid.com/, 1989-1990, Accessed Sep. 2012, 1 page.
Friendly Robotics, "Friendly Robotics-—Friendly Vac, Robotic Vacuum Cleaner," Retrieved from the Internet: URL< www.friendlyrobotics.com/vac.htm > 4 pages, Apr. 2005.
Friendly Robotics, Retrieved from the Internet: URL<http://www.robotsandrelax.com/PDFs/RV400Manual.pdf>. 18 pages, accessed Dec. 2011.
Goel et al., "Systematic Floor Coverage of Unknown Environments Using Rectangular Regions and Localization Certainty," IEEE/RSJ International Conference on Intelligent Robots and Systems (IROS), IEEE, Nov. 3-7, 2013, Tokyo, Japan, pp. 1-8.
Gutmann et al., "A Constant-Time Algorithm for Vector Field SLAM Using Exactly Sparse Extended Information Filter," in Proc. Robotics: Science and Systems, 2010, 8 pages.
Gutmann et al., "Challenges of Designing a Low-Cost Indoor Localization System Using Active Beacons," IEEE International Conference on Technologies for Practical Robot Applications (TePRA), IEEE, Apr. 22-23, 2013, Woburn, MA, pp. 1-6.
Gutmann et al., "Localization in a Vector Field Map," IEEE/RSJ International Conference on Intelligent Robots and Systems (IROS), IEEE, 2012, pp. 3144-3151.

(56) References Cited

OTHER PUBLICATIONS

Gutmann et al., "The Social Impact of a Systematic Floor Cleaner," IEEE Workshop on Advanced Robotics and its Social Impacts (ARSO), IEEE, May 21-213, 2012, Munich, Germany, pp. 50-53.

Gutmann et al., "Vector Field SLAM," IEEE International Conference on Robotics and Automation (ICRA), IEEE, 2010, pp. 236-242.

Hitachi: News release: "The home cleaning robot of the autonomous movement type (experimental machine)," Retrieved from the Internet: URL< www.i4u.com./japanreleases/hitachirobot.htm>. 5 pages, Mar. 2005.

Home Robot—UBOT; Microbotusa.com, retrieved from the WWW at www.microrobotusa.com, accessed Dec. 2, 2008, 2 pages.

Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.

IT media, Retrieved from the Internet: URL<http://www.itmedia.co.jp/news/0111/16/robofesta_m.html>. Accessed Nov. 1, 2011, 8 pages (with English translation).

It's eye, Retrieved from the Internet: URL< www.hitachi.co.jp/rd/pdf/topics/hitac2003_10.pdf>. , 2003, 11 pages (with English translation).

Karcher RC3000 RoboCleaner,—Image, Accessed at <http://www.karcher.de/versions/int/assets/video/2_4_robo_en.swf>. Accessed Sep. 2009, 1 page.

Karcher USA, RC3000 Robotic Cleaner, website: http://www.karcher-usa.com/showproducts.php?op=view prod¶m1=143&param2=&param3=, 3 pages, accessed Mar. 2005.

Matsumura Camera Online Shop: Retrieved from the Internet: URL< http://www.rakuten.co.jp/matsucame/587179/711512/>. Accessed Nov. 2011, 15 pages (with English translation).

"Put Your Roomba . . . On," Automatic webpages: http://www.acomputeredge.com/roomba, 3 pages, accessed Apr. 2005.

RoboMaid Sweeps Your Floors So You Won't Have To, the Official Site, website: Retrieved from the Internet: URL<http://therobomaid.com/>. 2 pages, accessed Mar. 2005.

Robot Buying Guide, "LG announces the first robotic vacuum cleaner for Korea," Retrieved from the Internet: URL<http://robotbg.com/news/2003/04/22/lg_announces_the_first_robotic_vacu>. 1 page, Apr. 2003.

Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.

The Sharper Image, eVac Robotic Vacuum—Product Details, www.sharperiamge.com/us/en/templates/products/pipmorework1printable.jhtml, 1 page, Accessed Mar. 2005.

"Tech-on!," Retrieved from the Internet: URL http://techon.nikkeibp.co.jp/members/01db/200203/1006501/, accessed Nov. 2011, 7 pages (with English translation).

UBOT, cleaning robot capable of wiping with a wet duster, Retrieved from the Internet: URL<http://us.aving.net/news/view.php?articleId=23031>. 4 pages, accessed Nov. 2011.

Yujin Robotics,"An intelligent cleaning robot," Retrieved from the Internet: URL<http://us.aving.net/news/view.php?articleId=7257>. 8 pages, accessed Nov. 2011.

Zoombot Remote Controlled Vaccuum-RV-500 NEW Roomba 2, website: http://cgi.ebay.com/ws/eBayISAPI.dll?ViewItem&category=43526&item=4373497618&rd=1, accessed Apr. 20, 2005, 7 pages.

AUTONOMOUS MOBILE ROBOT SYSTEM

CROSS REFERENCE TO RELATED APPLICATIONS

This U.S. patent application is a continuation of and claims priority under 35 U.S.C. §120 from U.S. patent application Ser. No. 13/299,982, filed on Nov. 18, 2011. U.S. patent Application Ser. No. 12/415,512, filed on Mar. 31, 2009, which claims priority under 35 U.S.C. §120 from U.S. patent application Ser. No. 11/176,048, filed on Jul. 7, 2005, which claims priority under 35 U.S.C. §119(c) to U.S. Provisional Application 60/586,046, filed on Jul. 7, 2004. The disclosures of these prior applications are considered pan of the disclosure of this application and are incorporated heroin by reference in their entireties.

TECHNICAL FIELD

The present invention relates generally to robotic systems and, more specifically, to navigational systems for autonomous robots.

BACKGROUND

Automated robots and robotic devices are becoming more prevalent today and are used to perform tasks traditionally considered mundane, time-consuming, or dangerous. As the programming technology increases, so too does the demand for robotic devices that can navigate around a complex environment or working space with little or no assistance from a human operator.

Robotic devices and associated controls, navigational systems, and other related systems are being developed. For example, U.S. Pat. No. 6,594,844 discloses a Robot Obstacle Detection System, the disclosure of which is hereby incorporated by reference in its entirety. Additional robot control and navigation systems, and other related systems, are disclosed in PCT Published Patent Application No. WO 2004/025947, and in U.S. patent application Ser. Nos. 10/167,851, 10/056, 804, 10/696,456, 10/661,835, 10/320,729, and 10/762,219, the disclosures of which are hereby incorporated by reference in their entireties.

Many autonomous robots navigate a working space by simply moving randomly until an obstacle is encountered. Generally, these types of robots have on-board obstacle detectors, such as bump sensors or similar devices, that register contact with an obstacle. Once contact is made, command routines typically direct the robot to move in a direction away from the obstacle. These types of systems, which are useful for obstacle avoidance, are limited in their ability to allow a robot to track its location within a room or other working environment. Other systems, often used in conjunction with the bump sensors described above, use an infrared or other detector to sense the presence of nearby walls, obstacles, or other objects, and either follow the obstacle or direct the robot away from it. These systems, however, are also limited in their ability to allow a robot to navigate effectively in a complex environment, as they allow the robot to only recognize when objects are in its immediate vicinity.

In more advanced navigational systems, a robot incorporates an infrared or other type of transmitter. This transmitter directs a series of infrared patterns in horizontal directions around the robot. These patterns are, in turn, detected by a stationary receiver, generally placed at or near a boundary of the working space, on a wall, for example. A microprocessor uses the information from the signals to calculate where in the working space the robot is located at all times; thus, the robot can truly navigate around an entire area. These types of systems, however, are best employed in working spaces where few objects are present that may interfere with the dispersed patterns of infrared signals.

These limitations of the above types of navigational systems are, at present, a hurdle to creating a highly independent autonomous robot, which can navigate in a complex environment. There is, therefore, a need for a navigational system for a robot that can allow the robot to operate autonomously within an environment that may be cluttered with a number of obstacles at or near the operational or ground level. Moreover, a navigational system that can be integrated with some or all of the above systems (the bump sensors, for example) is desirable. Such a navigational system should allow a robot to recognize where it is at all times within a working area, and learn the locations of obstacles therein.

SUMMARY

In one aspect, the invention relates to a navigational system for an autonomous robot that includes a stationary transmitter for emitting at least two signals, the signals directed toward a surface remote from a working area, such as a wall bordering a floor (upon which a robot operates), or a ceiling located above the floor. The system also includes a receiver mounted to an autonomous robot containing various power, motive, and task-related components. The receiver detects the two signals emitted by the emitter, and a processor determines the location of the robot within the working area based upon the received signals. Generally, the signals directed to the remote surface are infrared signals, but other embodiments are also possible. The robot detects the signal energy reflected from the ceiling and, by calculating the azimuth and elevation of the signals relative to the robot, can determine its location.

In another aspect, the invention relates to a method of control for an autonomous robot including the steps of: transmitting a signal from a stationary emitter to a surface remote from a working area; detecting the signal using a receiver integral with an autonomous robot; and directing a movement of the autonomous robot within the working area, the movement based at least in part upon detection of the signal.

In yet another aspect, the invention relates to a method of control for an autonomous robot including the steps of: transmitting at least two signals from a stationary emitter to a surface remote from a working area; detecting the signals using a receiver integral with an autonomous robot; and determining a location of the autonomous robot within the working area, the location based at least in part upon detection of the signal.

In still another aspect, the invention relates to a signal transmitter for providing navigational markings for use by an autonomous robot including: a power source; and a modulated signal emitter, wherein the signal emitter sequentially emits a first coded signal and a second coded signal, the first signal and the second signal directed to a surface remote from a working area of the robot.

In still another aspect, the invention relates to a receiver for detecting emitted navigational markings, the receiver mountable to an autonomous robot, the receiver including: a lens including a plurality of photodiodes, each photodiode oriented orthogonally to each adjacent photodiode, each photodiode adapted to detect a signal reflected from a remote surface; and a processor for processing the signals received from the plurality of photodiodes, the processor including a plurality of data outputs.

In another aspect, the invention relates to a navigational control system for an autonomous robot including a transmitter subsystem having a stationary emitter for emitting at least one signal, and an autonomous robot operating within a working area, the autonomous robot having a receiving subsystem. The receiving subsystem has a receiver for detecting the signal emitted by the emitter and a processor for determining a relative location of the robot within the working area upon the receiver detecting the signal. In certain embodiments of the above aspect, the emitter includes a modulated signal emitter and may sequentially emit a first coded signal and a second coded signal. In other embodiments of this aspect, the receiver includes a plurality of photodiodes, and may include four or five photodiodes. In some embodiments, at least four photodiodes are arranged in a substantially planar orientation, and may be oriented orthogonally to each adjacent photodiode. In certain embodiments, the fifth photodiode is oriented substantially orthogonally to each of the four photodiodes. Some embodiments orient at least one of the photodiodes in a direction corresponding to a reference direction of travel of the robot.

In other embodiments of the above aspect, the processor further includes a navigational control algorithm, and may direct a movement of the robot within the working area upon the receiver detecting the signal. In certain embodiments, the emitter emits at least two signals, and may be located on a robot docking station. In certain embodiments, the signal includes light having at least one of a visible wavelength and an infrared wavelength. Alternative embodiments direct at least one signal at a surface remote from the working area.

In another aspect, the invention relates to a method of control for an autonomous robot, including the steps of transmitting a signal from a stationary emitter, detecting the signal using a receiver integral with the robot operating within a working area, and determining a relative position of the robot in the working area based at least in part on the detected signal. The method may include the step of directing a movement of the robot within the working area, the movement based at least in part upon the position of the robot. Certain embodiments may include the step of storing a position of the robot and/or the step of comparing the position of the robot to a stored position.

Other embodiments of the above aspect include the step of directing a movement of the robot within the working area, the movement based at least in part on the stored position. In certain embodiments, the relative position of the robot is based at least in part on at least one of an elevation and an azimuth of the detected signal. In other embodiments, the transmitted signal is directed to a surface remote from the working area.

BRIEF DESCRIPTION OF THE DRAWINGS

The drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
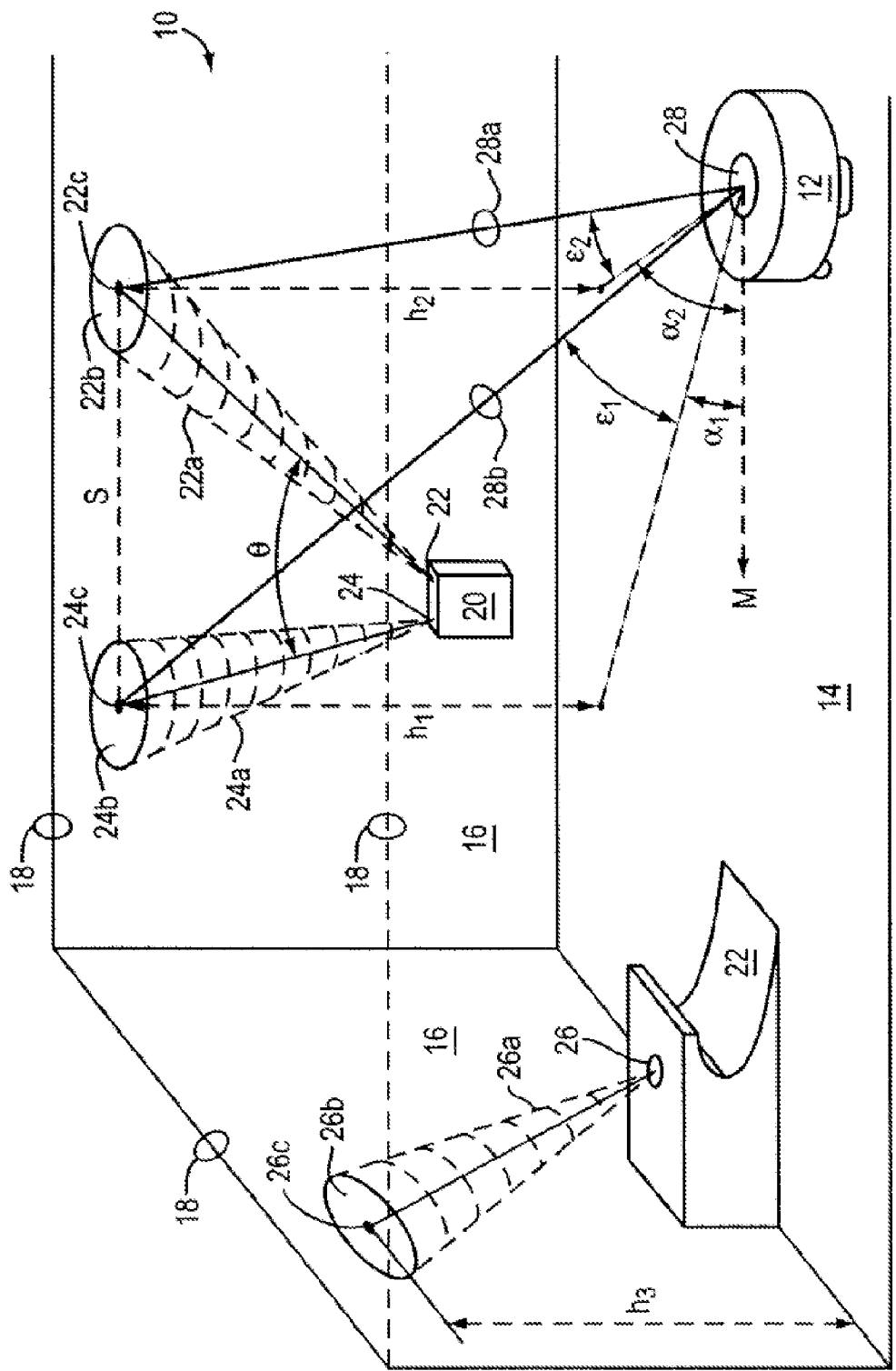
FIG. 1 is a schematic view of a navigational system for an autonomous robot in accordance with one embodiment of the invention.

FIG. 1 is a schematic view of a navigational system 10 for an autonomous robot 12 in accordance with one embodiment of the invention. The components of the system 10 include, in this embodiment, a transmitter 20, a charging or base station 22, and a robot 12 that operates in a room or other similar working area 14. In this case, the working area 14 is a floor of a room, bounded at least in part by walls 16. Borders of a ceiling 18 also intersect the walls 16 and are remote from the working area 14. The depicted transmitter 20 includes two emitters 22, 24. In this embodiment, the base station 22 may include an emitter 26 as well. In various embodiments, any combination or quantity of emitters may be used on the base station 26, or transmitter 20, or both. The robot 12 includes an on-board microprocessor, power and drive components, task-specific components (dirt sensors, vacuums, brushes, etc.), and at least one receiver, such as a infrared receiver 28. The robot 12 may also include certain buttons, switches, etc. for programming the robot, or such instructions may be directed by a remote control (not shown) or a personal computer (not shown). Depending on the application, certain components may be removed from the disclosed system 10, or other components may be added. Also, for simplicity, this disclosure will describe vacuuming as a demonstrative task of the autonomous robot 12. It will be apparent, though, that the navigation system disclosed herein has wide applications across a variety of robotic systems. For example, a robot may be used for floor waxing and polishing, floor scrubbing, ice resurfacing (as typically performed by equipment manufactured under the brand name ZAMBONI®), sweeping and vacuuming, unfinished floor sanding and stain/paint application, ice melting and snow removal, grass cutting, etc. Any number of task-specific components may be required for such duties, and may each be incorporated into the robot, as necessary.

The transmitter 20 directs at least two infrared signals 22a, 24a from emitters 22, 24 to a surface remote from the working area 14 upon which the robot 12 operates. The depicted embodiment directs the signals 22a, 24a to the ceiling 18, but it may also direct the signals 22a, 24a to a portion of a wall 16, or both. The signals 22a, 24a may be directed to any point on the remote surface, but directing the signals as high as possible above the working area 14 is generally desirable. Directing the signals to a high point allows them to be more easily detected by the robot 12, as the field of view of the robot receiver 28 is less likely to be blocked by a tall obstacle (such as a high-backed chair or tall plant). In this disclosure, the regions of contact 22b, 24b of the signals 22a, 24a on the remote surface will be referred to as "points," regardless of the size of the intersection. For example, by using a collimator in conjunction with the emitters (described below), the points of intersection 22b, 24b of the signals 22a, 22b can be a finite area with the signal strongest at approximately central points 22c, 24c. In alternative embodiments, central points 22c, 24c represent focused laser or other signals that may be used for navigation.

In one embodiment of the transmitter, the signals 22a, 24a are directed towards a ceiling 18, at two points 22c, 24c, forming a line proximate and parallel to the wall 16 upon which the transmitter 20 is located. Alternatively, and as depicted in FIG. 1, the signals 22a, 24b may be directed out away from the wall 16, at an angle of approximately 5° or more, to avoid any interference with objects such as pictures secured to or hung from the wall 16. Generally, the signals 22a, 24a are transmitted at a known angle θ between the two signals 22a, 24a; in one such embodiment, θ equals approximately 30°, but other angles are contemplated. This angle θ may be set at the time of manufacture or user-defined based on particular applications or other requirements. By setting the angle θ to a known value, the distance S between the signals 22a, 24a at the point of contact 22b, 24b with ceiling 18 may be determined, provided the heights of the ceiling $h_1$, $h_2$ at the points of contact 22b, 24b are known. Note that when used on a flat ceiling 18, as depicted, $h_1$ equals $h_2$.

In the embodiment depicted in FIG. 1, base station 22 emits signal 26a, which may serve as another or optional signal that the robot 12 may utilize. Here signal 26a is directed toward a wall 16, so that the point of contact 26b is high enough to avoid any objects that may obstruct the robot's 12 field of view. Central point 26c (or laser point) contacts the wall 16 at height $h_3$.

As the robot 12 moves within a working area 14, it detects the signals 22a, 24a emitted by the transmitter 20 as energy bouncing or reflecting off the diffuse ceiling surface 18. In an alternative embodiment, visible points may be used in place of infrared points. An on-board camera may replace the infrared receiver in detecting either infrared or visible points. The robot's microprocessor converts the signals 22b, 24b sensed by the receiver 28 into bearings from the robot 12 to the signals 22b, 24b. The microprocessor calculates the representative elevation angles $\epsilon_1$, $\epsilon_2$ and the azimuths $\alpha_1$, $\alpha_2$ of the signals to determine the location of the robot 12 within the working area 14. In this embodiment, the azimuths $\alpha_1$, $\alpha_2$ are measured utilizing the "forward" direction of movement M of the robot 12 as a datum, but any suitable datum can be used. By calculating the elevation angle and azimuth from the robot 12 to the two signals 22b, 24b, the robot 12 is able to locate itself within a room with accuracy.

Figure 2:
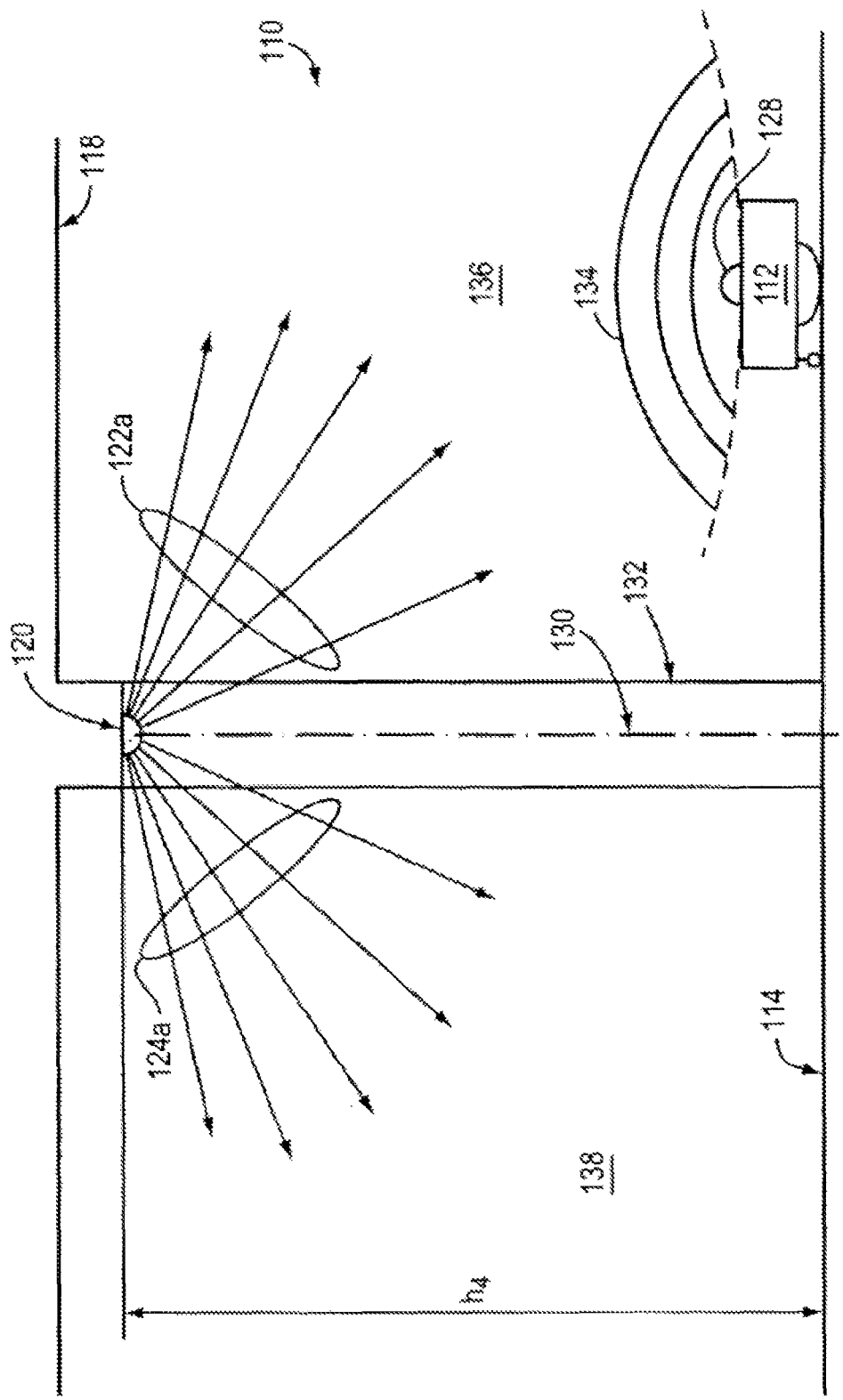
FIG. 2 is a schematic view of a navigational system for an autonomous robot in accordance with another embodiment of the invention.

FIG. 2 depicts another embodiment of a navigational system 110 for an autonomous robot 112 in accordance with the invention. Here, a robot 112 moves in a working area, in this case a floor 114. A transmitter 120 is installed at the top frame of a doorway 132 between two rooms 136, 138. Similar to the embodiment depicted in FIG. 1, the transmitter 120 is installed at a known distance $h_4$ above work area 114. In other embodiments, the transmitter 120 may be installed at the height of ceiling 118. The transmitter 120 may also be recessed within the door frame 130 or ceiling 118 to reduce its profile and limit the impact on architectural aesthetics of a room. Additionally, the transmitter 120 may be disguised to resemble a cover plate for a sprinkler head, speaker, or other device.

The transmitter 120 emits two signals 122a, 124a (depicted graphically by a plurality of arrows) into the two rooms 136, 138. The signals 122a, 124a may be configured to not overlap each other, therefore providing a distinct signal on each side of the door centerline 130. In other embodiments, overlap of the signals 122a, 124a may be desired. The robot 112 includes a receiver 128 that has a field of vision 134. The emitted signals 122a, 124a are detected by the receiver 128 when the robot's field of vision 134 intersects the signals 122a, 124a. Similar to the embodiment in FIG. 1, the robot calculates the azimuth and elevation to the transmitter 120 to determine its relative location. Similar to the embodiment described above, by detecting only one signal, the robot 112 can calculate a bearing to the transmitter 120. Accordingly, the transmitter 120 functions as a beacon for the robot 112 to follow and, if the signal is coded, the robot 112 may determine which room of a number of rooms it is located in, based on the coded signal. In this regard, the robot 112 is able to determine its relative location, on a room-by-room basis, as opposed to determining its location within a room.

Figure 3A:
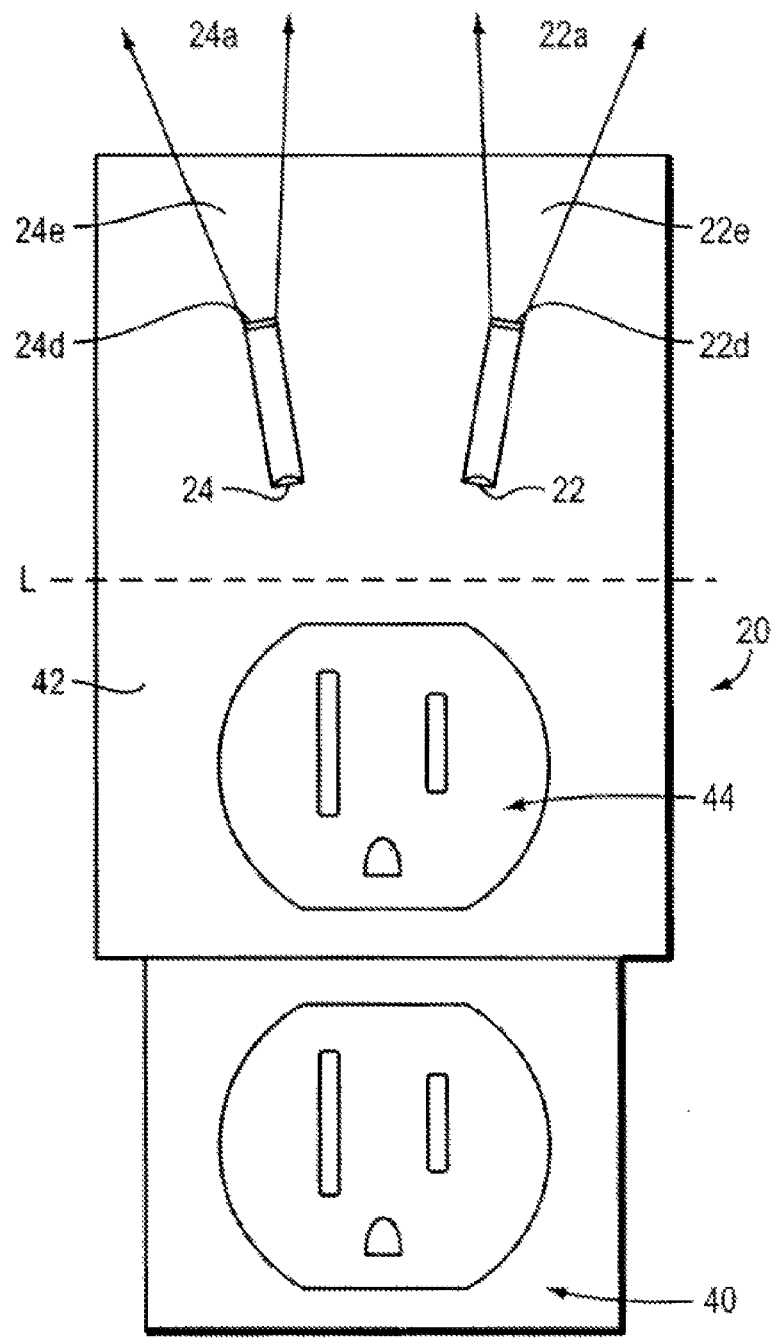
FIG. 3A is a side view of a stationary emitter in accordance with one embodiment of the invention.

FIG. 3A shows a transmitter 20 in accordance with one embodiment of the invention. The depicted transmitter 20 is plugged into a wall outlet 40 for convenience and unobtrusiveness, but other transmitters and locations may be utilized. For example, the transmitter may be placed anywhere within a room, provided it has an available power source. Battery-powered transmitters are particularly versatile, in that they may be located remote from a wall outlet. Such battery-operated transmitters could be unobtrusively located above window or door frames, or on top of tall furniture such as dressers or bookshelves. Optionally, the transmitter may include a visible signal option, aligned with the emitted signals, allowing a user to direct the signals to particular locations when the device is initially installed. Additionally, more than one transmitter may be used, if desired. Such a system could include communication capability between the various transmitters, for example to ensure that only one signal or a subset of signals are emitted at any given time.

The transmitter 20 in FIG. 3A includes a housing 42, constructed of plastic or like material. The transmitter 20 may include a power receptacle 44 so the outlet that the transmitter 20 utilizes for power is still available for other uses. (In this figure, the transmitter 20 is shown cut-away above the line L.) The transmitter includes two emitters 22, 24, set within the housing 42. Alternatively, the emitters 22, 24 may be flush with or extend beyond the housing 42. Setting the emitters 22, 24 within the housing 42 allows the signals 22a, 24a to be directed by utilizing collimators 22e, 24e. The collimators 22e, 24e may be formed within the housing 42 or may be discreet components within the housing 42. Alternatively, the collimators 22e, 24e may be secured to the outside of the housing 42. In alternative embodiments, lenses 22d, 24d may be included, with or without collimators 22e, 24e to focus and direct the signals 22a, 24a. These basic manufacturing considerations can also be adapted for emitters that are utilized on charging or base stations as well. One or more emitters on a base station can serve as an additional point of navigation for the robot within the room, or may simply aid the robot in locating the base station.

Figure 3B:
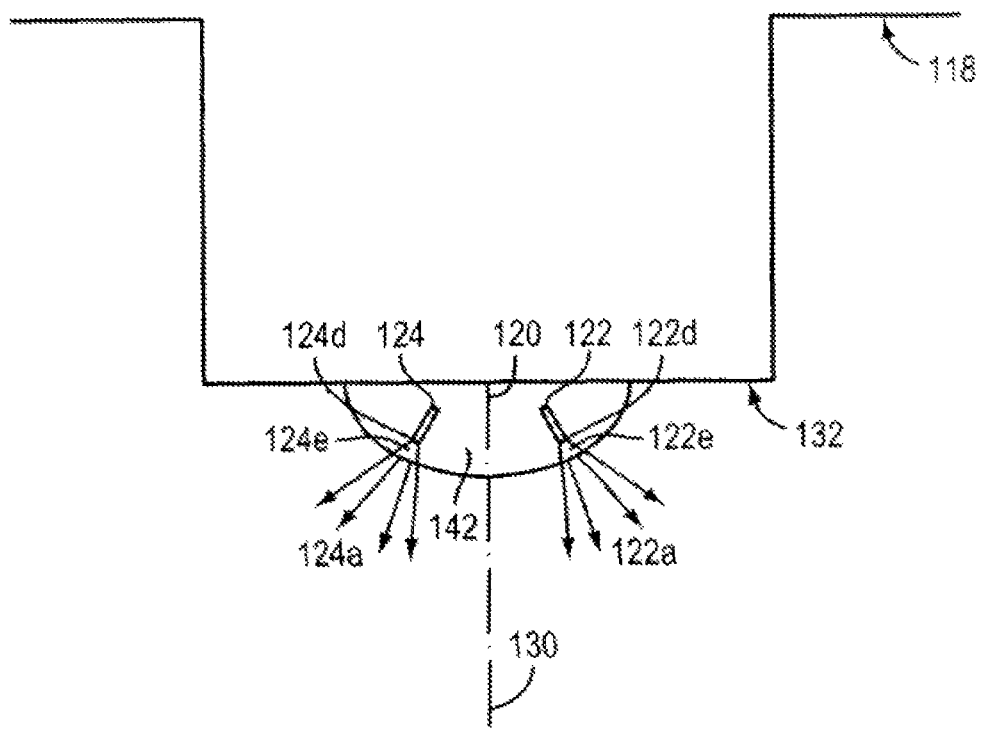
FIG. 3B is a side view of a stationary emitter in accordance with another embodiment of the invention.

FIG. 3B depicts a transmitter 120 for use with the navigational system 110 depicted in FIG. 2. The transmitter 120 is secured to the underside of an upper cross member of the door frame 132, but may also be recessed therein or secured to or recessed within ceiling 118. The transmitter 120 includes two emitters 122, 124. Other embodiments of the transmitter 120 may include more than two emitters or just a single emitter, depending on the application. By utilizing two emitters the transmitter can direct signals into two different rooms, generally on either side of the centerline 130 of the door frame 132. This allows a robot to distinguish in which room it is presently located. More than two emitters may be utilized with collimators 122e, 124e to distinguish different areas within a given room. Such configuration allows the robot to sense its relative location within a room and adjust its cleaning behavior accordingly. For example, a signal could mark an area of the room that the robot would likely get stuck in; the emitted signal could allow the robot to recognize the area and accordingly not enter it, even though it might otherwise be able to do so unimpeded. Alternatively, or in addition, the different signals could mark areas that require different cleaning behaviors (due to carpeting or wood floors, high traffic areas, etc.).

Turning back to FIG. 3B, the emitters may be installed flush with or extend beyond the housing 142. Setting the emitters 122, 124 within the housing 142 allows the signals 122a, 124a to be directed by utilizing collimators 122e, 124e. The collimators 122e, 124e allow the signals 122, 124 to be directed to two sides of the centerline 130 of doorframe 132, without any signal overlap, if so desired. The collimators 122e, 124e may be formed within the housing 142 or may be discreet components within the housing 142. Alternatively, the collimators 122e, 124e may be secured to the outside of the housing 142. In alternative embodiments, lenses 122d, 124d may be included, with or without collimators 122e, 124e, to focus and direct the signals 122a, 124a.

In one embodiment of the invention, each signal (regardless of emitter location or number of signals) is modulated at 10 kHz, and is coded with an 8-bit code to serve as a unique identifier of the signal, thus preventing the robot from confusing one point with another. Accordingly, more than two signals may be employed to increase the accuracy of the robot's calculations regarding its location within a working area. As noted above, using only one emitter allows the robot to take a heading base on that signal. Using more than two points enables the robot to continue navigating, if fewer than all of the points are detected (either due to failure of a signal transmission or if the robot moves to a location where fewer than all the points are visible).

In one embodiment, the transmitter pulses the coded signals as follows. After an initial synchronization pulse, the first signal at 10 kHz is emitted for 100 ms. This provides a sufficient time period for the receiver and the processor in the robot to calculate azimuth and elevation angles, as discussed in detail hereinbelow. So that the robot can also determine which signal is being received, the transmitter next pulses a series of five bits, each for 10 ms. The five bits include two start bits, for example a zero and a one, followed by a unique three bit identifier to identify that particular signal or point. After a 100 ms delay, the transmitter repeats the sequence for the second signal or point. By changing the modulation frequency and/or the identifier, the second signal or point can be uniquely distinguished from the first. Any number of unique signals can be transmitted and identified, in this manner. After the series of signals are transmitted, the transmitter waits a substantially longer period of time, for example on the order of a random one to two second interval, before repeating the transmitting sequence, starting again with the first signal. The length of time for each transmission is merely exemplary, and may be varied based upon user preference, application, or other needs. Additionally, the signals may be modulated at the same or different frequencies.

Figure 4A:
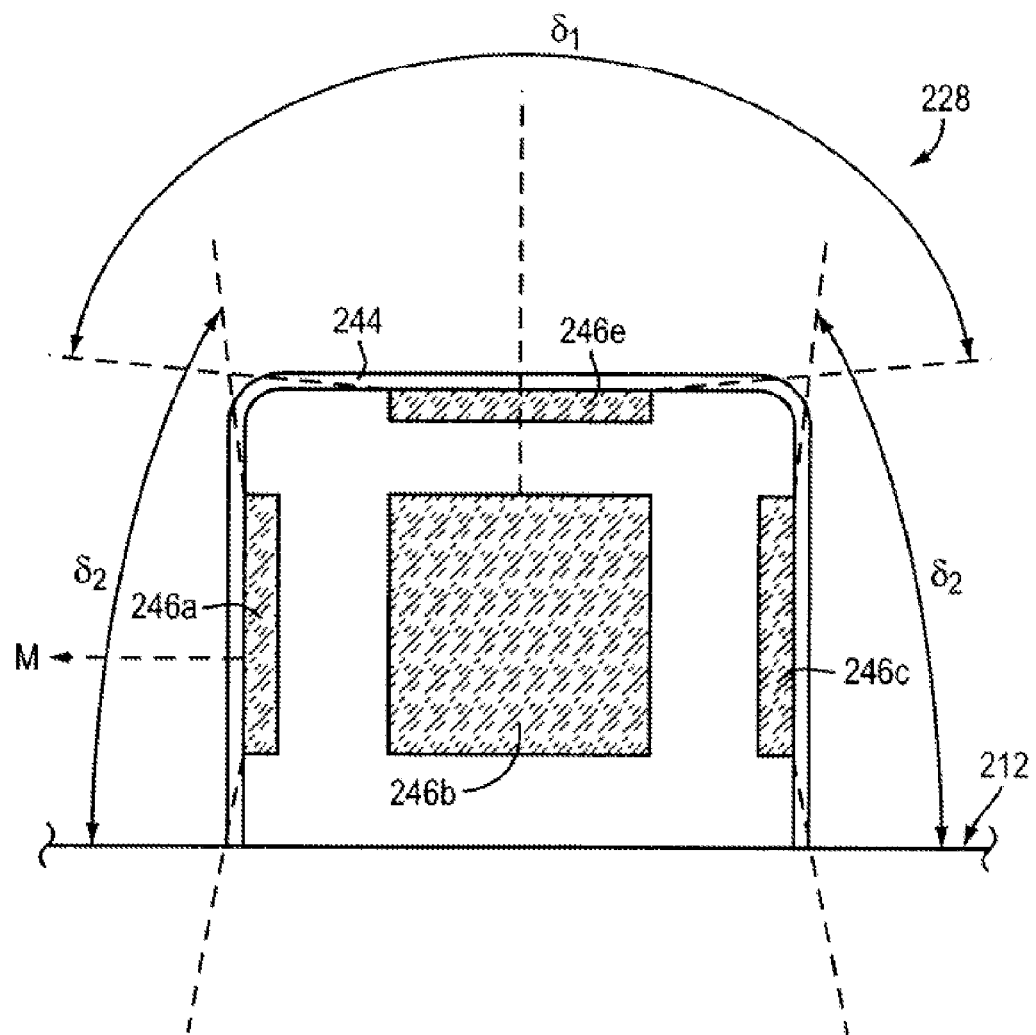
FIG. 4A is a side view of a infrared receiver for an autonomous robot in accordance with one embodiment of the invention.
Figure 4B:
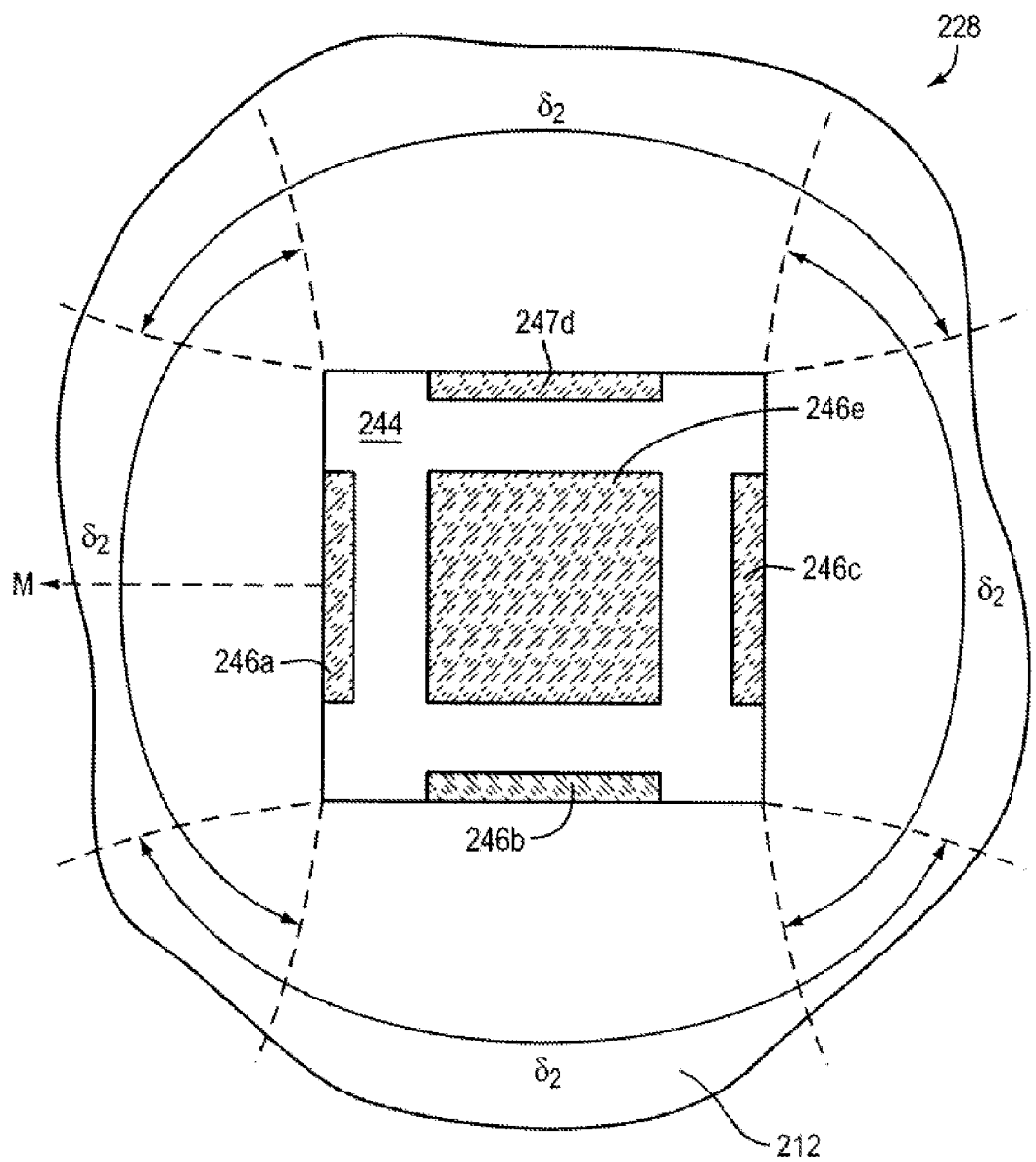
FIG. 4B is a top view of the infrared receiver of FIG. 4A.

FIG. 4A depicts a side view of a receiver 228 for use with an autonomous robot, the receiver 228 surface mounted on the robot housing 212. FIG. 4B is a top view of the same receiver 228. The receiver 228 includes an outer shell or housing 244 of a generally translucent or transparent, high-impact plastic or like material. Four photodiodes 246a, 246b, 246c, and 246d are installed in an orientation in the housing 244 generally corresponding to four adjacent sides of a cube. Accordingly, each photodiode is generally perpendicular to the two photodiodes on either side of it and parallel to the photodiode opposite it. Located generally above the plane of orientation of photodiodes 246a-246d is a fifth photodiode 246e. At least one photodiode, in this case photodiode 246a, is oriented toward a direction of forward movement M of the robot. The photodiodes are connected via control wiring and other components to the robot's microprocessor and related systems. Installing the receiver 228 on the top of the housing 212 provides the robot with a very wide field of view. As depicted, the field of view $\delta_1$ for the horizontally oriented photodiode 246e is extremely wide. Depending on the sensitivity of the photodiode 246e, the thickness or translucence of the plastic, and other factors, the field of view $\delta_1$ may approach or exceed 180°. Similarly, due to the orientation of photodiodes 246a-246d, their field of view $\delta_2$ approaches near vertical in the direction upwards from the robot housing 212 and is limited below only by the robot housing 212 itself. There is overlap between the fields of view $\delta_2$ in the longitudinal plane, as depicted in FIG. 4B.

As apparent from FIG. 4A, there is overlap between the fields of view $\delta_1$ and $\delta_2$, allowing the robot to readily detect signals within a space in which the robot is operating. The overlap creates a total field of view for the receiver that approaches the entire volume of the room above the robot housing. Accordingly, this embodiment of the receiver 212, is particularly well-suited to the embodiment of the navigation system depicted and described in FIG. 2, where a signal is projected into an entire room. Of course, this receiver 228 could also be used with the system depicted in FIG. 1. Although installing the receiver closer to or above the top surface of the robot provides for a wider range of view, this configuration increases slightly the height of the robot and can limit robot travel beneath certain obstacles such as couches, low tables, or the like.

Figure 4C:
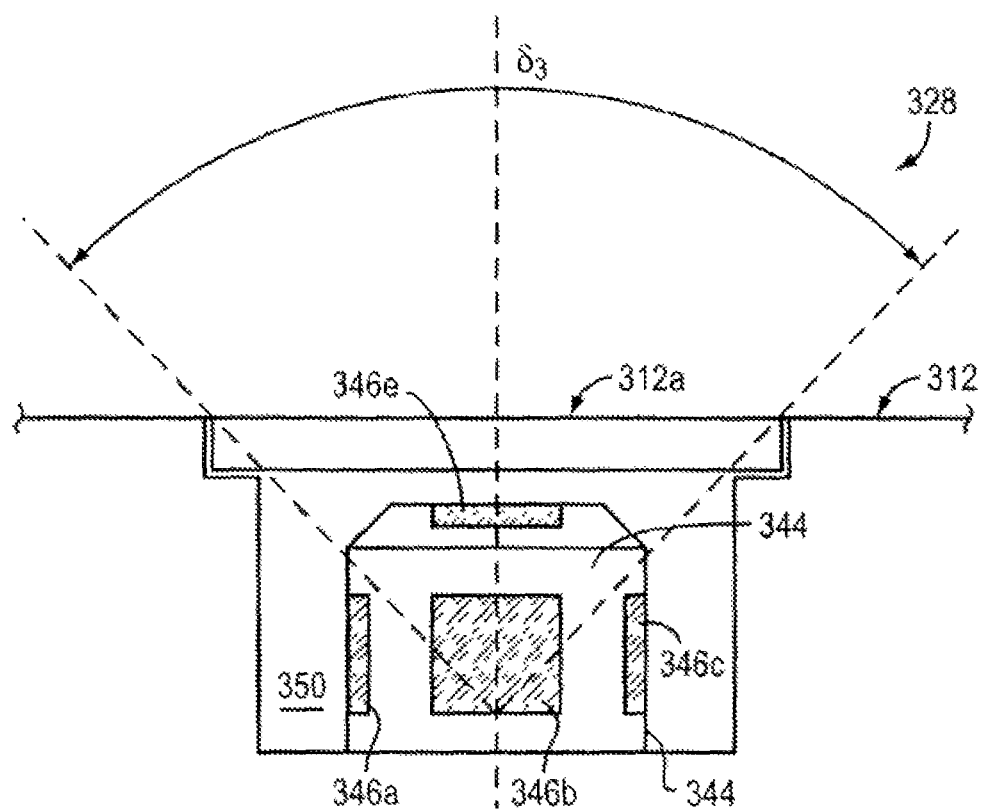
FIG. 4C is a side view of a infrared receiver for an autonomous robot in accordance with another embodiment of the invention.

FIG. 4C depicts an embodiment of the receiver 328 installed below the surface of the robot housing 312. The photodiodes (as a group, 346) are installed in a void 350 or other cavity below the surface of the robot housing 312. A translucent or transparent plastic cover 312a fits over the void and photodiodes 346. The cover 312a may be secured to the housing 312 with screws, press-fit connections, or other connectors. Alternatively, the cover 312a may be simply set in place without connectors, allowing for easier access to the photodiodes 346 for service or replacement. This lower profile version reduces or eliminates the risk associated with the surface mounted receiver described above getting stuck below obstacles.

The construction of this receiver 328 is similar to that of FIG. 4A. Four of the photodiodes 346a-346d are installed orthogonal to each other, facing a predefined direction on the robot (i.e., front, back, right, and left). The fifth photodiode 346e is installed orthogonal to the other four, facing directly up from the top of the robot. Because the photodiodes 346 are set within the housing 312, the receiver's overall field of view $\delta_3$ is limited somewhat. In this embodiment, $\delta_3$ equals approximately 120°. The field of view $\delta_3$ may be wider or narrower depending on the depth of installation below the surface of the robot housing 312. Alternatively, the field of view $\delta_3$ may also be modified by utilizing a cover 312a having particular effects on signal transmission, such as a fish-eye lens or the like.

Figure 5A:
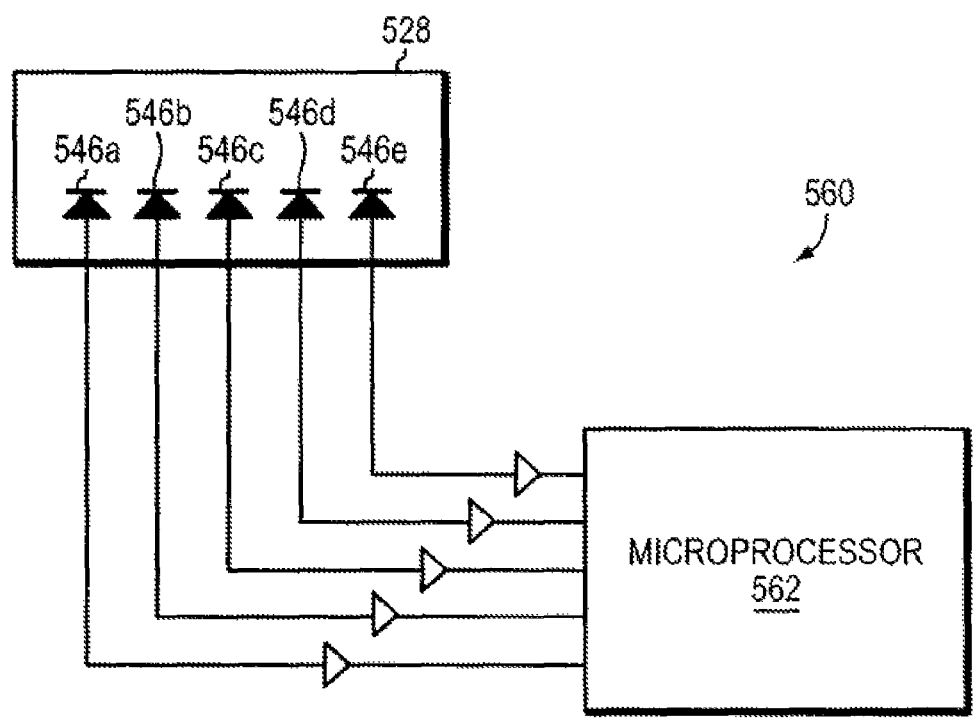
FIG. 5A is a representation of the control system of an infrared receiver for an autonomous robot in accordance with one embodiment of the invention.

One embodiment of the control schematic 560 for the receiver 528 is depicted in FIG. 5A. The infrared receiver 528 includes a number of independent photodiodes (generally, 546), pre-amplified and multiplexed into a single microprocessor 562. As described above, four of the photodiodes 546a-546d are installed orthogonal to each other, facing a predefined direction on the robot (i.e., front, back, right, and left). The fifth photodiode 546e is installed orthogonal to the other four, facing directly up from the top of the robot. Once a reflected signal is received by a photodiode 546, the receiver 528 determines the frequency of modulation of the signal, the identity sequence, if any, and the envelope of received energy (i.e., the demodulation of energy). These values are sent to the microprocessor 562 that, in turn, calculates the location of the robot relative to the signals and the identities of the signals. Additionally, if only a single point is detected by the receiver 528 (if, for example, the robot's view of the second signal is obstructed), the robot may use this point as a heading. By following this heading, the robot can move within the work area until the second point is detected.

In operation, the receiver first measures the "noise floor," the amount of infrared energy present in the space in which the robot is located, which it sets as the threshold value. Generally, this value is the average of the values for each photodiode. Any subsequent measurement above this threshold value triggers an event (e.g., a calculation of point azimuth and elevation). The receiver then measures the modulation frequency again, searching for an expected increase at 10 kHz (i.e., the frequency of the initial synchronization signal transmitted by the transmitter). If a 10 kHz frequency increase is detected, the robot recognizes this as an emitted navigational signal. The robot then measures the amplitude of the reflected point on all five photodiodes to determine an average value. This value is then compared to a list of signal frequencies to determine which of the signals has been detected. Alternatively, any detected identity sequence associated with the signal can be compared to a list of transmitter codes or signal IDs stored in a lookup table in the robot processor memory.

The on-board microprocessor uses the amplitude value to determine the azimuth and elevation of the received signals, that it then uses to determine its location within a working area. To determine the azimuth, the microprocessor enters the values of the two strongest readings from the four side photodiodes into an algorithm. The algorithm takes the ratio of these two readings to determine the azimuth angle. For example, if the two strongest readings from two photodiodes are equal, the algorithm recognizes that the point is located at an azimuth angle that is directly between the two photodiodes (i.e., at 45 degrees). In a similar algorithm, the amplitude value measured from the strongest side photodiode and the amplitude value measured from the top-facing photodiode value are used to determine the elevation of the signal. These values are then stored in the robot's memory for future reference.

Once the receiver has detected at least two points, and determines the azimuth and elevation of each point, it determines its location within the working space. A triangulation algorithm based on the known ceiling height and the azimuth and elevation of the two detected points allows the processor to determine where in the working space the robot is located. Over time, the values of elevation and azimuth between each coded point and specific locations of the robot within the workspace are stored in the robot's memory, creating a map of the environment in which the robot operates.

Figure 5B:
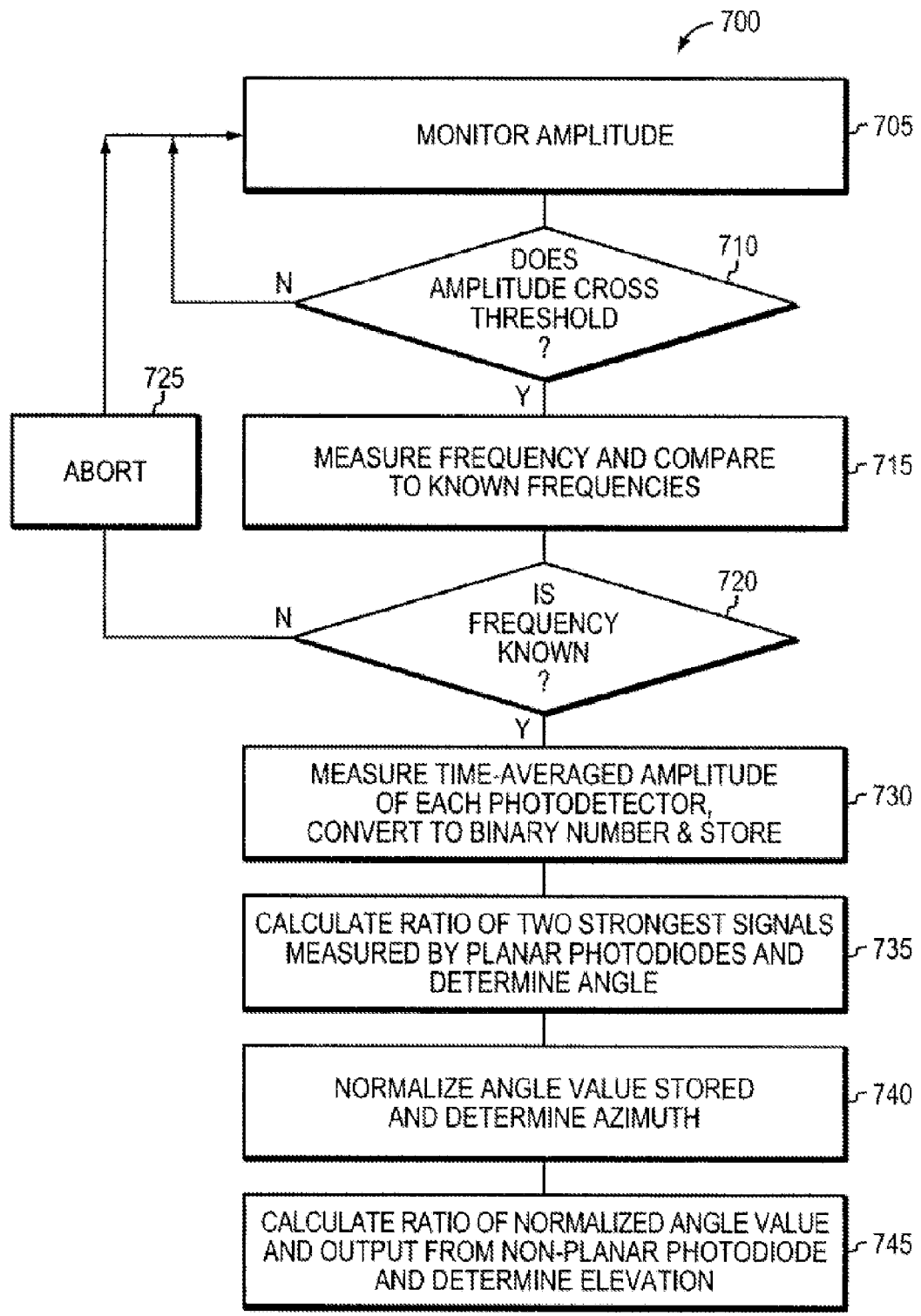
FIG. 5B is a flowchart of a signal detection and localization program in accordance with one embodiment of the invention.

In a specific embodiment, the navigation system 200 depicted in FIG. 5B uses an angle-based localization system. Values corresponding to elevation and azimuth are determined by synchronously comparing average amplitudes from the number of detectors arranged on the robot. Of the five detectors, four are arranged in a plane and are angularly spaced by 90° increments. The fifth detector is in the center of the aforementioned four-detector array and aimed so that it is orthogonal to every detector, directed vertically from the robot. Together, this five-element array has a full or near-full hemispherical field of view.

In the embodiment depicted in FIG. 5B, all five detectors monitor for amplitude (Step 705) until an amplitude that crosses a preset threshold is detected (Step 710). After the amplitude on any detector crosses the preset detection threshold, the frequency of the signal on the strongest detector is measured and compared against known transmit frequencies (Step 715). If the measured frequency is one of the known transmit frequencies (Step 720), the next step in the detection process is executed. If the signal is not a known transmit frequency, the detection process is aborted (Step 725) and the signal detected is declared to be "out of band." Once an "in band" frequency is detected, a time-averaged amplitude of each photodetector is measured, converted to a binary number, and stored for later processing in a microprocessor memory (Step 730). Upon storing the five numerical values (one for each photodiode), the azimuth angle is determined.

Of the four detectors that reside in a single plane, the values of the two strongest signals detected are used to form a ratio to determine the azimuth angle (Step 735). The ratio of second-strongest signal over the strongest signal is either compared to a look-up table or inserted into a mathematical equation to determine an azimuth angle output. Both the look-up table and the equation represent the overlap of the received sensitivity patterns of two orthogonal detectors with known sensor responses. In this embodiment, the photodetector output is modeled as a fourth-order Gaussian response to angle off of "boresight," a term that generally refers to a vector that is orthogonal to the semiconductor die in the detector package.

To calculate elevation, the strongest signal from azimuth calculation (i.e., the denominator of the ratio) must first be normalized, as if it were on boresight of the respective detector (Step 740). For example, if the azimuth has been determined to be 10° off of boresight from a given detector, that 10° angle is entered into a look-up table or equation that describes the sensor response of any single photodetector. At zero degrees, the output of this look-up table/equation would be 1.00000. As the angle deviates from zero degrees, the output drops to some fraction of 1.00000 (the normalized value at boresight). For example, if a value of 10° is entered into said equation, the output of this operation may be 0.99000. The denominator of the azimuth ratio is then divided by this fractional value in order to scale up, or "normalize," that value to what it would be if the azimuth were actually zero degrees. This normalized value is then stored in memory, and elevation may be determined.

To calculate elevation, the normalized output from the previous step is used to produce a new ratio with the output from the upward-looking (fifth) detector, such that the numerator is the second-strongest of the two values and the denominator is the strongest of the two values (Step 745). This ratio is then entered into the same look-up table or equation from the step above (used to calculate azimuth), thus outputting an elevation angle.

Benefits of this type of navigation system are numerous. As the robot moves about a working area, measuring the azimuth and elevation of the various points detected, the robot can create a map of the area, thus determining its location within a given space. With this information, the robot can fuse data from all of its on-board sensors and improve cleaning or other task efficiency. One way it can do this is to create a map where the high-traffic areas in a house or other building are located (as indicated by readings from the dirt sensor, for example). The robot would then clean the areas it identified as high traffic (and therefore, often dirty) each time it passes over that area, whether directed to or not. The robot may also improve its cleaning function by merging the output from the wheel drop, stasis, bumper, and wall-following sensors to roughly mark areas of entrapment, or where large obstacles exist, so that those areas can potentially be avoided in future runs.

Another method of improving cleaning efficiency involves selectively programming the robot to clean particular areas, as detailed below. For example, a personal computer or remote control may be used to control the autonomous robot. Although the robot can operate without operator intervention, an operator would first set up the robot, or may wish to direct the robot to operate in particular areas or at particular times. For example, by using a number of transmitters in various rooms on one floor of a house, an operator may be able to direct the robot to clean a number of specific rooms at a certain time. The operator could select, in the control program field of the computer program, the living room, family room, bathroom, and kitchen areas for selected cleaning. Once commanded (either immediately or on a predefined schedule), the robot would be signaled to begin its cleaning cycle. The robot undocks from its base/charging station and begins cleaning the closest room on the programmed list. It recognizes this room and can differentiate it by the coded group of infrared points on the ceiling or the coded signal emitted in the room. After the first room is cleaned, the robot checks its level of power, and if needed, returns to its charger for additional charging. In order to return to the charger, in one embodiment the robot can follow the point or points on the ceiling back to the base station. After charging is complete, the robot traverses the area roughly back to the place it left off and resumes cleaning. This sequence of events continues until all of the programmed rooms have been cleaned. Alternatively, the selection of particular areas to clean could be made by remote control or by pressing buttons on a control panel located on the base station. By using a personal computer, however, multiple transmitters could communicate with each other and with the base station via power lines using HOME GENIE®, ECHELON®, or equivalent technology.

Figure 6:
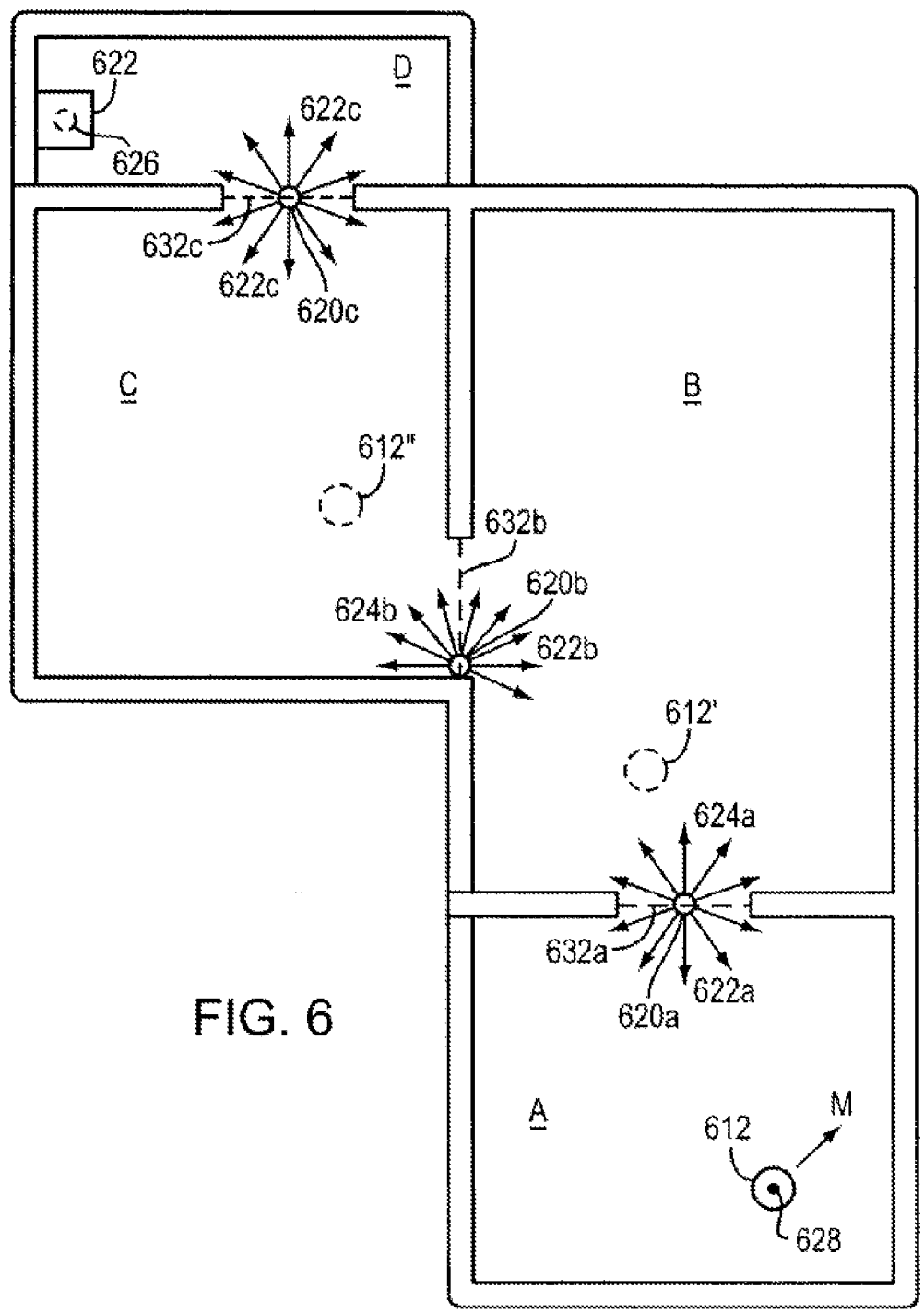
FIG. 6 is a top view of a navigational system for an autonomous robot in accordance with another embodiment of the invention.

An alternative embodiment is depicted in FIG. 6, where a robot uses a number of signals for headings to move from room to room. Robot 612 is moving M within room A when its power level drops below a predetermined level, requiring the robot to return to is base charging station 622. Upon crossing the predetermined power level, the robot's receiver 628 searches for a signal from a nearby emitter. As the robot is located in room A, it detects the signal 622a emitted from transmitter 620a and, using the signal 622a as a heading, moves directly for that signal 622a.

Alternatively, the robot 612 may emit its own coded pulse, to determine if any transmitters are in the area. This coded pulse could "awaken" sleeping or otherwise dormant transmitters, which would then begin their own emission cycle. Alternatively, the pulse may be some audible or visual signal such as a distinct beep, buzz, or visual strobe. Note that this pulse need not be within the field of view of the transmitter.

The robot 612 will continue to move toward signal 622a until one of several events happens at or near doorway 632a. In the first event, the robot may determine, based on readings from its photodiodes, that it is directly under the transmitter 620a. In the second event, the robot 612 may sense a second signal 624a, that may overlap the first detected signal 622a. This event would occur if the configuration of the emitters, collimators, etc., as described in more detail above, provided overlapping signal patterns between signals 622a and 624a. In a third event, robot 612 may sense a signal from an entirely different transmitter, in this case signal 622b from transmitter 620b. Other events are also contemplated, as suitable for the particular application. The occurrence of the event presents the robot 612 with any number of behavioral, functional, or other options. For example, each coded signal may serve as a unique marker for a different working space. Upon detecting the unique signal associated with a particular working space, the robot may alter its cleaning function. If room A is carpeted but room B is uncarpeted, the robot may adjust its cleaning as it moves from room A to room B. Alternatively, if room B is a known high traffic area and the robot has sufficient power available, the robot 612 may spend a period of time cleaning room B before continuing its return to base 622. Upon detecting a second signal (in this case, signal 622b) the robot may completely disregard the first signal 622a received when the return to the base station 622 began. Using new signal 622b as a heading, it begins moving toward that signal 622b. The robot 612 may also check its battery level at each event, storing that value in its microprocessor. Over time, the robot will have created a table of battery levels at each event (and battery level change from event to event), and be able to accurately determine precise battery power remaining at each transmitter location.

Once the robot has been moving in room B (shown as 612' in phantom), it will eventually determine, based on battery level, time, or other factors, to follow the heading provided by signal 622b, and continue its return to its base station 622. The robot 612 will follow the heading until an event occurs at or near doorway 632b. Again, the event may be detecting a strength of signal 622b, indicating that the robot is directly below the transmitter, detecting an overlap signal from 624b, or detecting a new signal 622c. The robot 612 may again perform any of the behaviors described above, check and store its battery level, change cleaning characteristics, etc.

Once in room C, the robot 612" may again, as required, begin to follow the heading provided by signal 622c. Again, at or near doorway 632c to room D, an event may direct the robot to perform any number of behaviors. Alternatively, the robot may move directly to charging station 622, guided by emitted signal 626 or some other signal or program.

During its return to base station, as the robot 612 moves from room A to room B to room C and so on, it detects and stores the information about each coded signal that it detects along its route. By storing this information, the robot creates a map, using the coded signals as guideposts, allowing it to return to its starting location in the future. After charging, the robot can return to the room it was working in prior to returning to its base, by comparing the detected signals to those stored in its memory.

Figure 7:
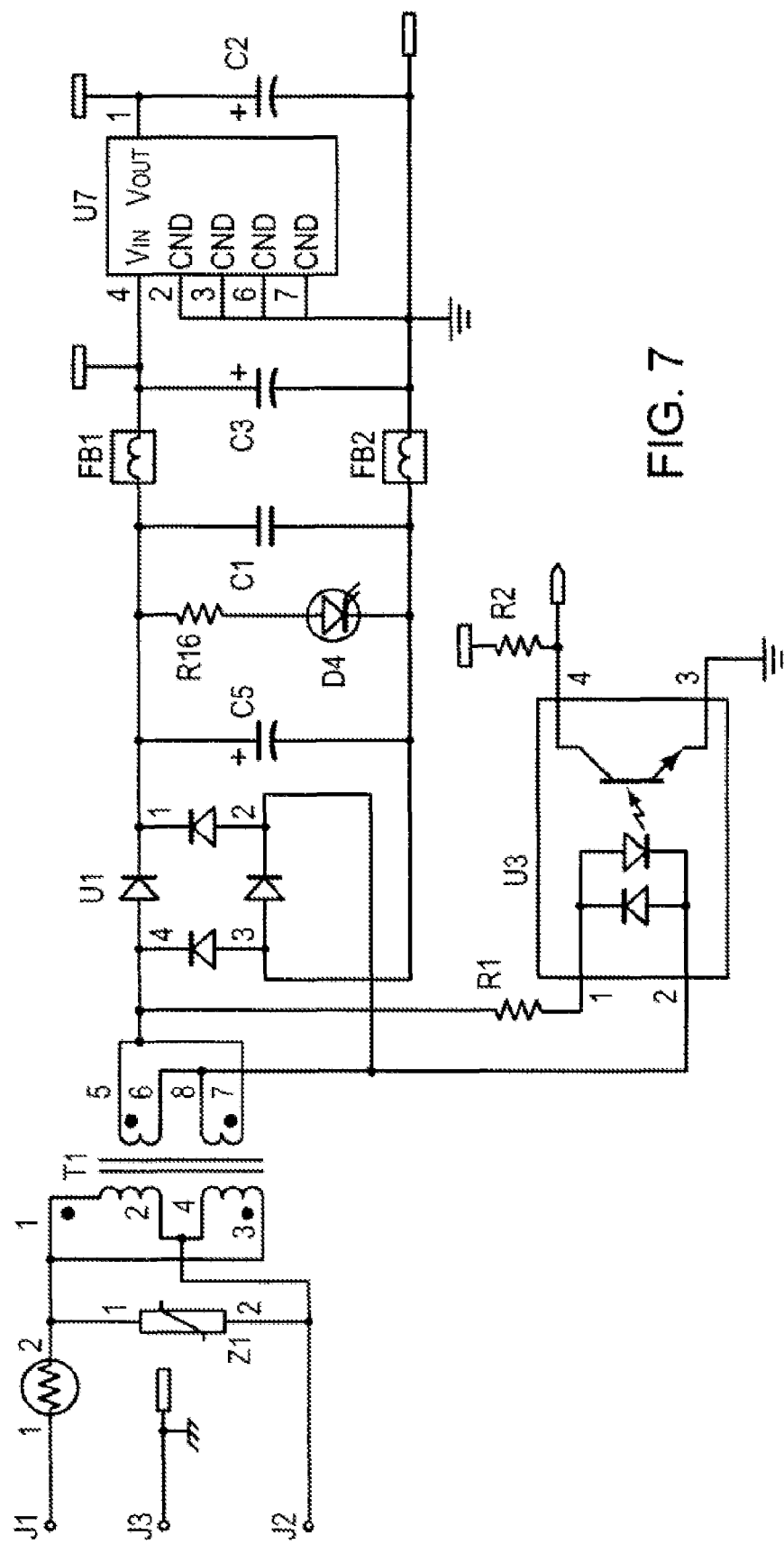
FIGS. 7-14 are schematic circuit diagrams of infrared receivers and transmitters for a navigational system in accordance with one embodiment of the invention.
Figure 8:
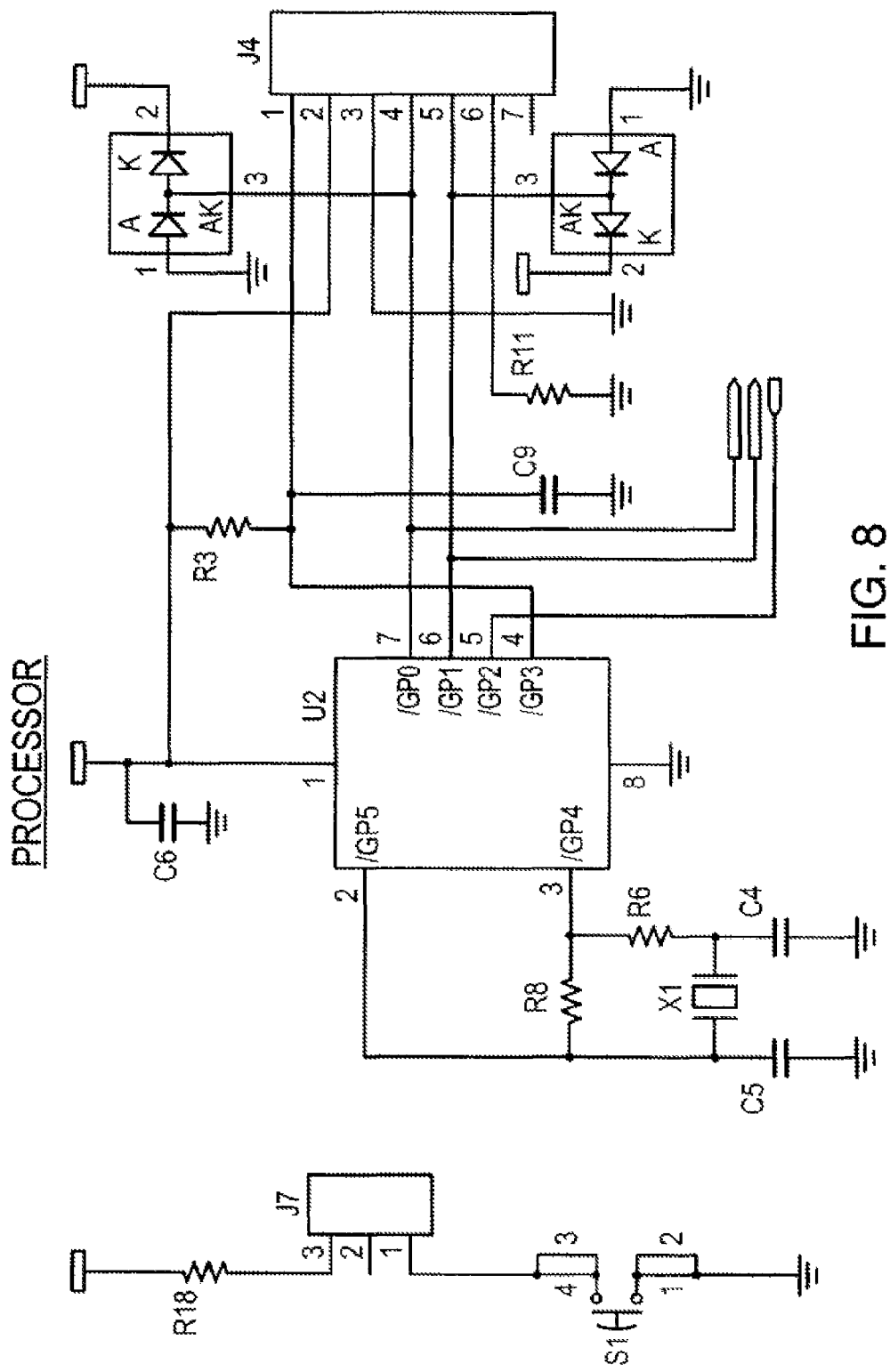
Figure 9:
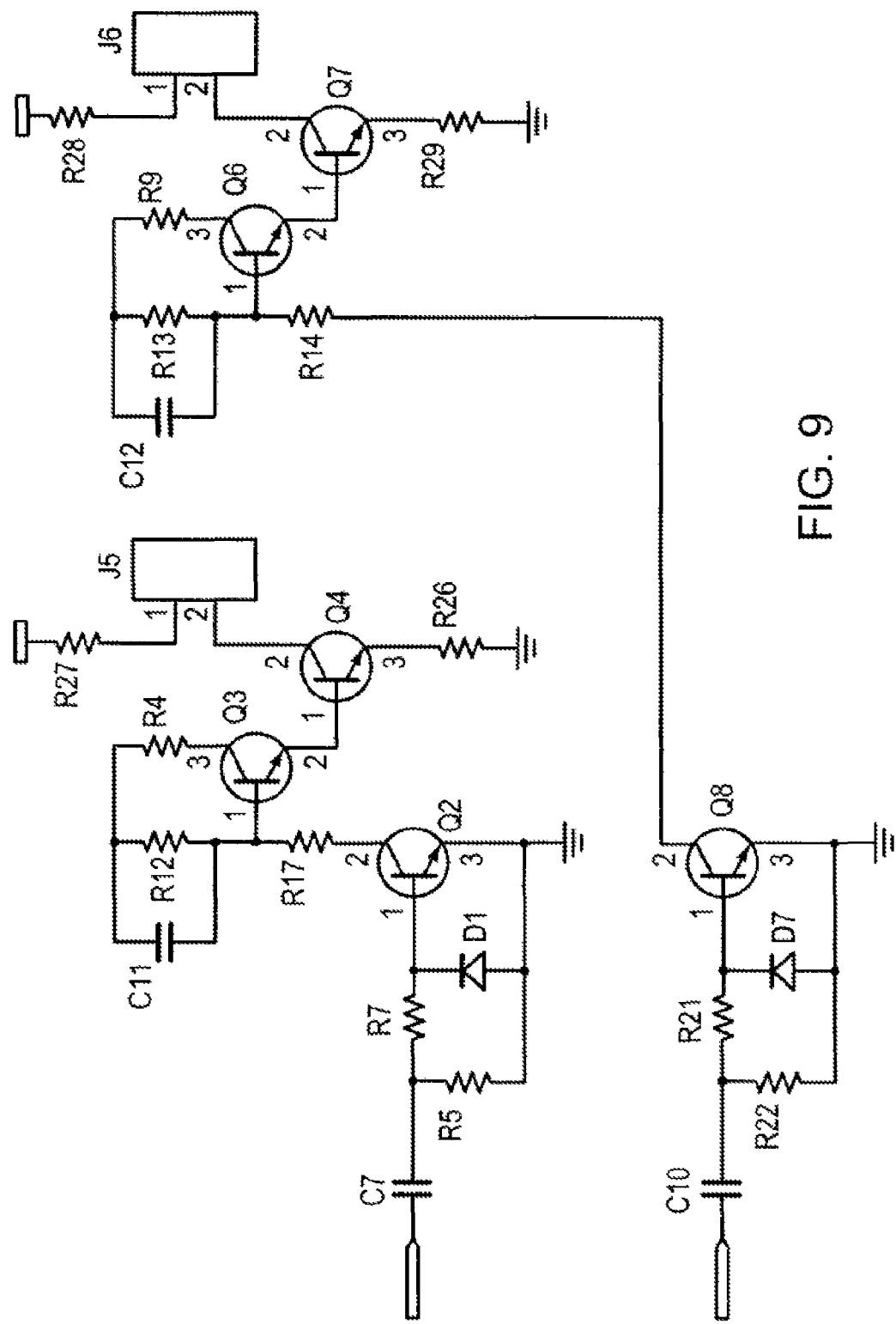

FIGS. 7-9 depict schematic circuit representations in one embodiment of various components of an infrared signal transmitter, namely an AC-DC converter, a microcontroller and support circuitry, and LED drivers. More specifically, FIG. 7 shows an electronic circuit that takes 120 VAC/60 Hz line voltage and converts it to a regulated +5 VDC supply. This supply is used to power the microcontroller and associated circuitry of the transmitter, depicted in FIG. 8. In addition to the power conversion, this circuit also provides an isolated digital logic signal to the microcontroller, whenever a "zero-crossing" in the AC line input is detected.

FIG. 8 includes the transmitter microcontroller and support circuitry (i.e., a clock oscillator and an in-circuit serial programming port). In addition, there is a circuit that allows a user initiated button press to project visible light from a pair of LEDs, co-located with the pair of IR LEDs, onto the remote surface for the purpose of assisting the user in aiming the infrared signal points.

FIG. 9 depicts two channels of infrared LED driver. Each driver controls a preset constant current into a single IR LED, that then emits near-infrared light that is collimated by an external lens and projected onto the remote surface. Each LED is modulated and can be pulse-coded independently of the other. This allows the microcontroller in the robot to discern between the different transmitter signals, to determine which detected signal is which.

Figure 10:
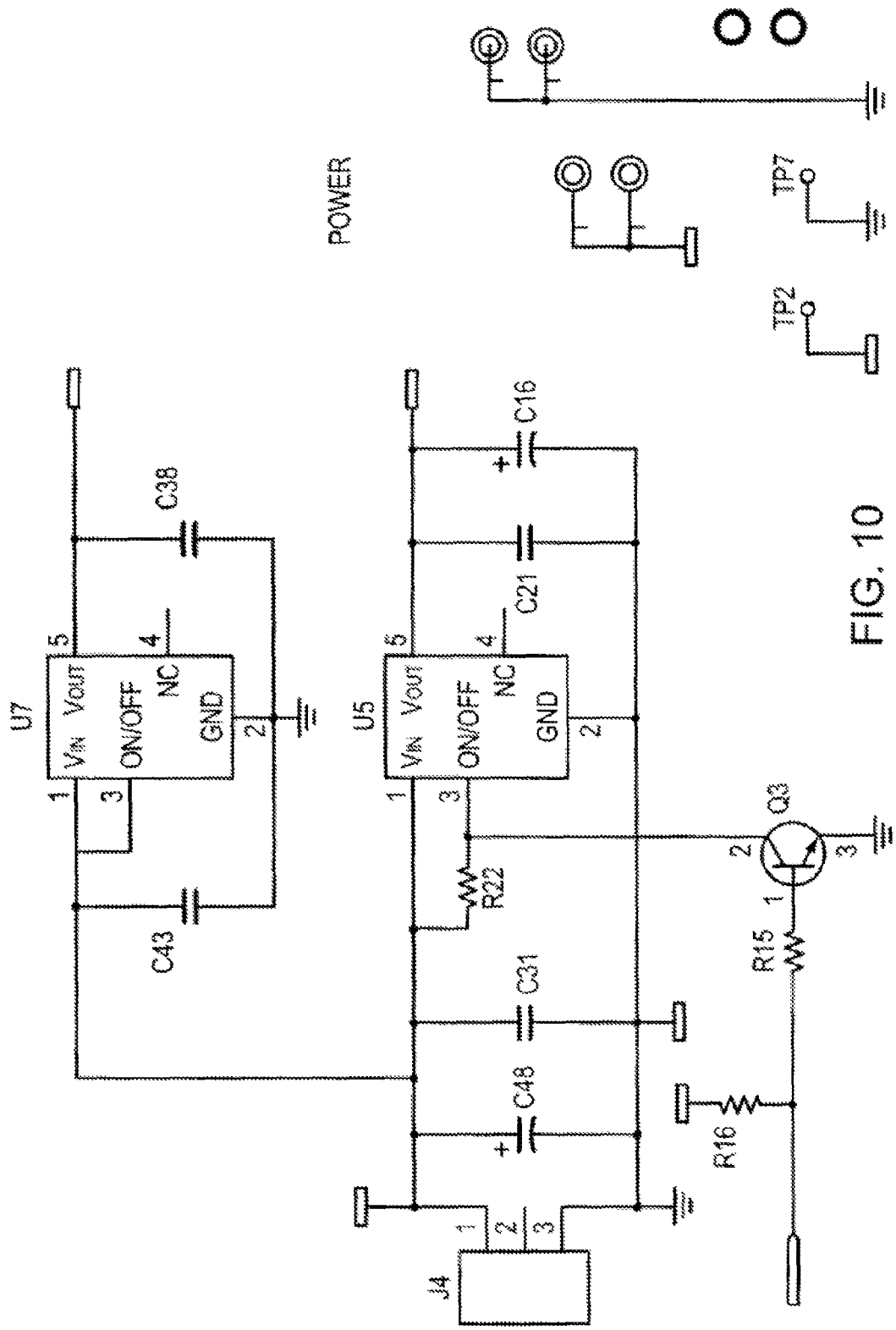

FIGS. 10-14 depict schematic circuit representations in one embodiment of various components of the robot mounted infrared receiver, namely DC-DC linear power converters, a five channel preamplifier, a multiplexer and programmable tuned amplifier, detectors, and a microcontroller and associated peripherals. More specifically, FIG. 10 depicts two independent linear voltage regulators. One of the regulation circuits is switched ON-OFF via microcontroller control, in order to conserve battery power during a sleep mode.

Figure 11A:
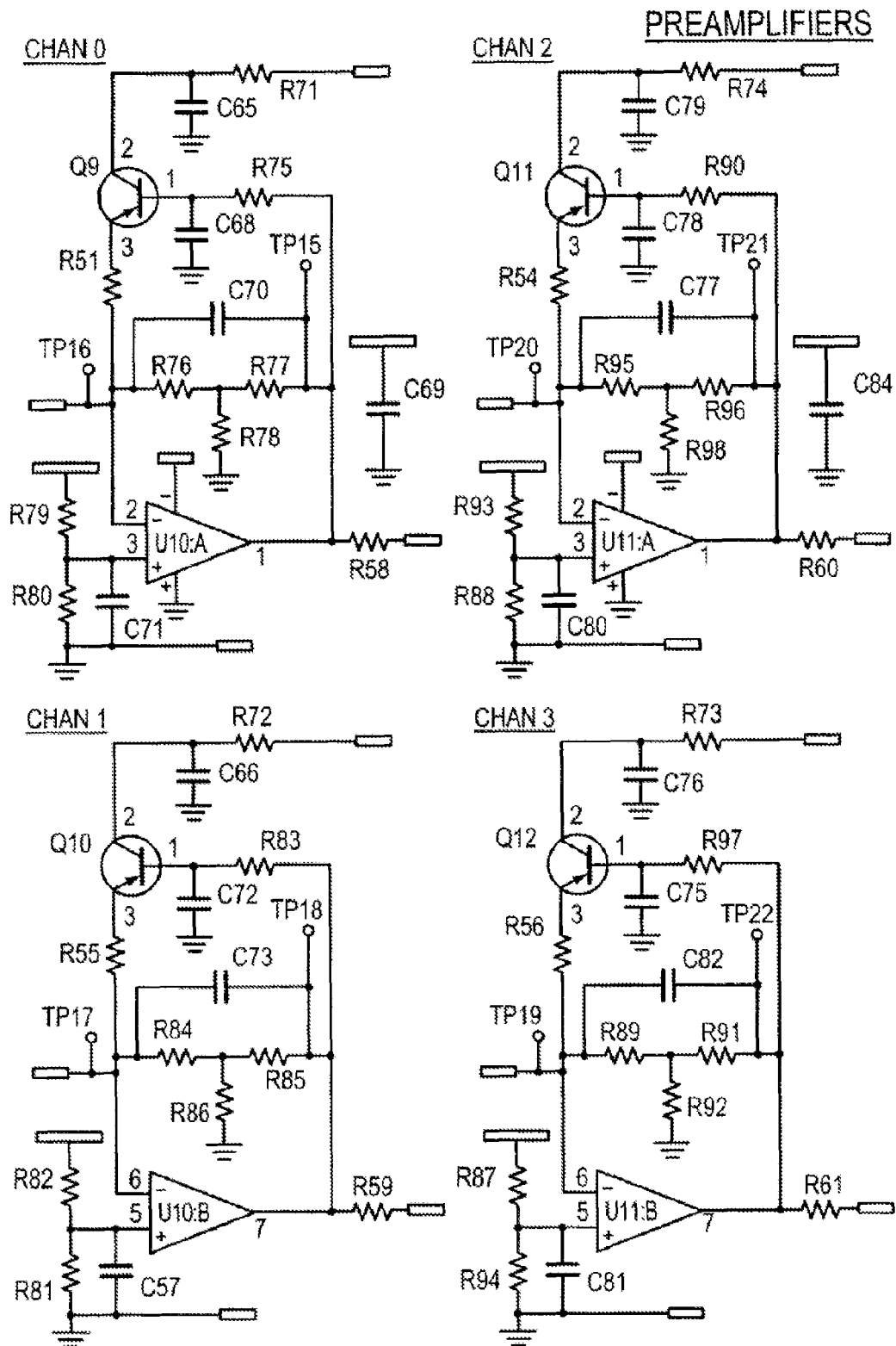
Figure 11B:
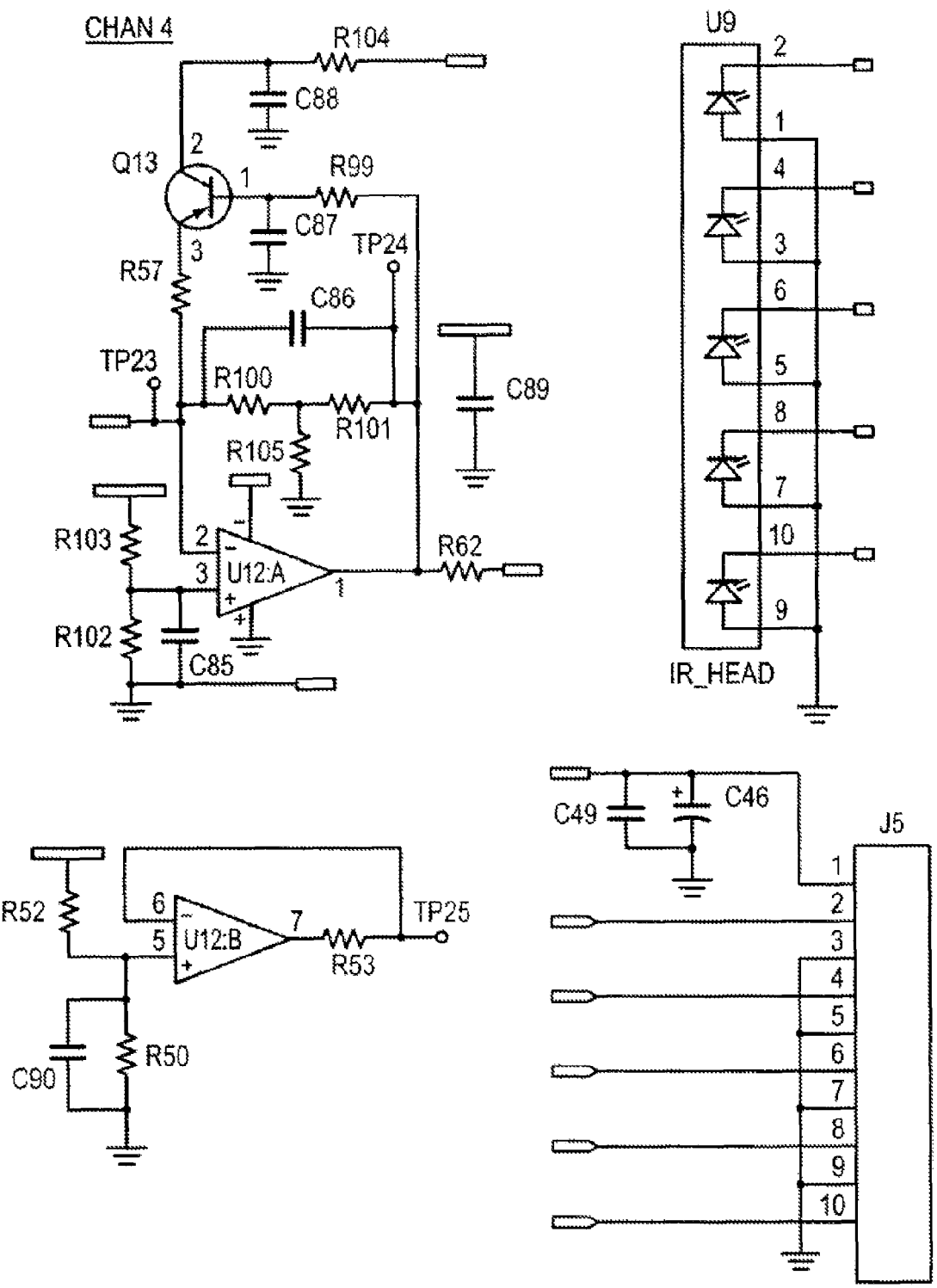

FIG. 11 depicts five independent preamplifiers, that convert respective photodiode output currents into voltages of much larger magnitudes. Each preamplifier is built using an operational amplifier in a transimpedance topology. This is so that the preamplifiers can be configured with low-noise. Also, there is a novel, active feedback circuit, that is used to null out large photodiode current offsets caused by exposure of the circuit to sunlight and other strong low-frequency light sources.

Figure 12:
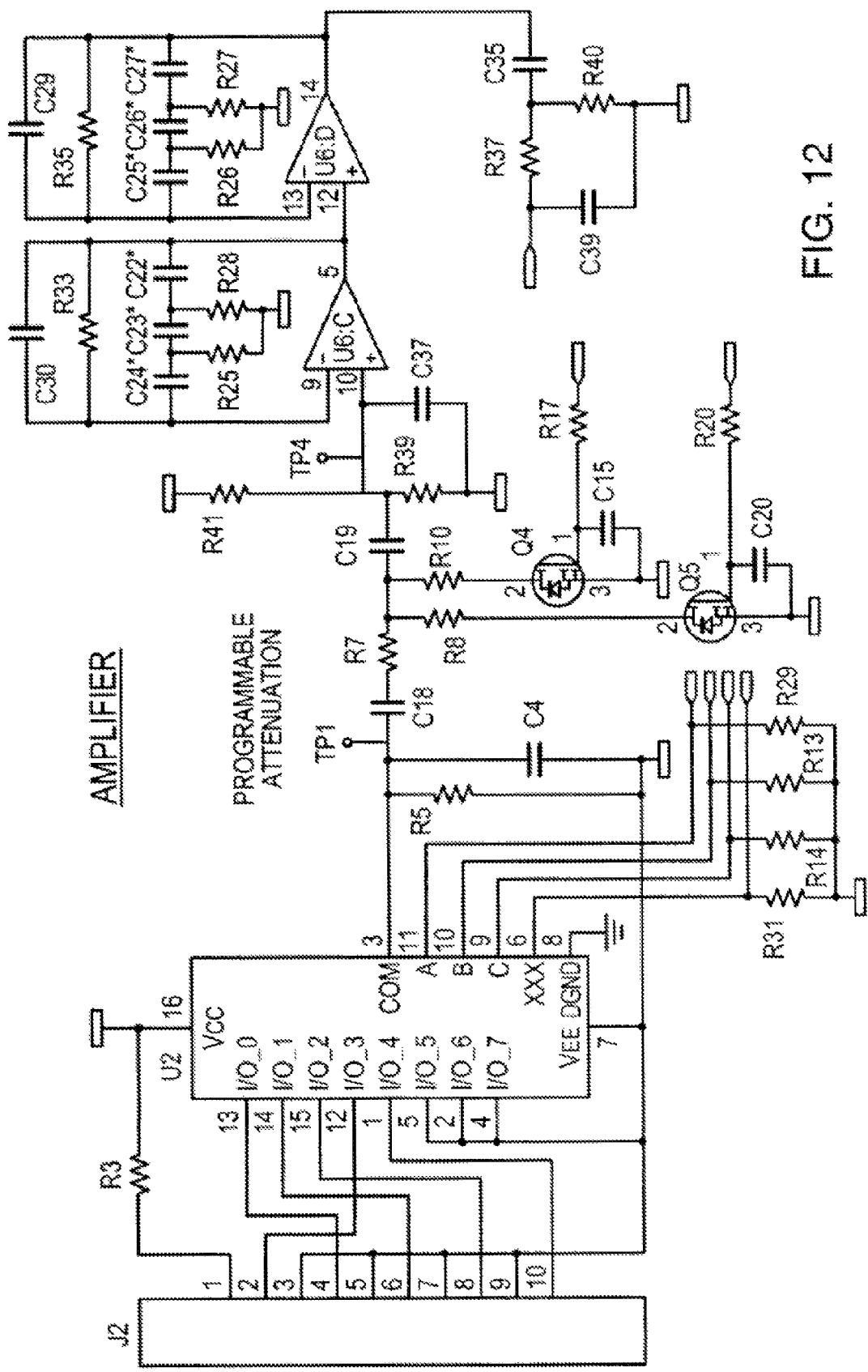

FIG. 12 is a multiplexer and programmable tuned amplifier for the receiver. This circuitry can be functionally segregated into three functional blocks. The first block is a multiplexer, that receives signals from the five photodiode preamplifiers and outputs one of them to a programmable attenuator, as commanded by the receiver's microcontroller. The second block is the programmable attenuator, that is used to reduce the overall receiver gain, to deal with the enormous dynamic range of received signals. As depicted herein, there are two digital inputs from the microcontroller, which permits four discrete gain levels to be selected. The third block is a tuned, band-pass amplifier, that provides the bulk of the voltage amplification to signals which fall within the circuit's pass-band.

Figure 13:
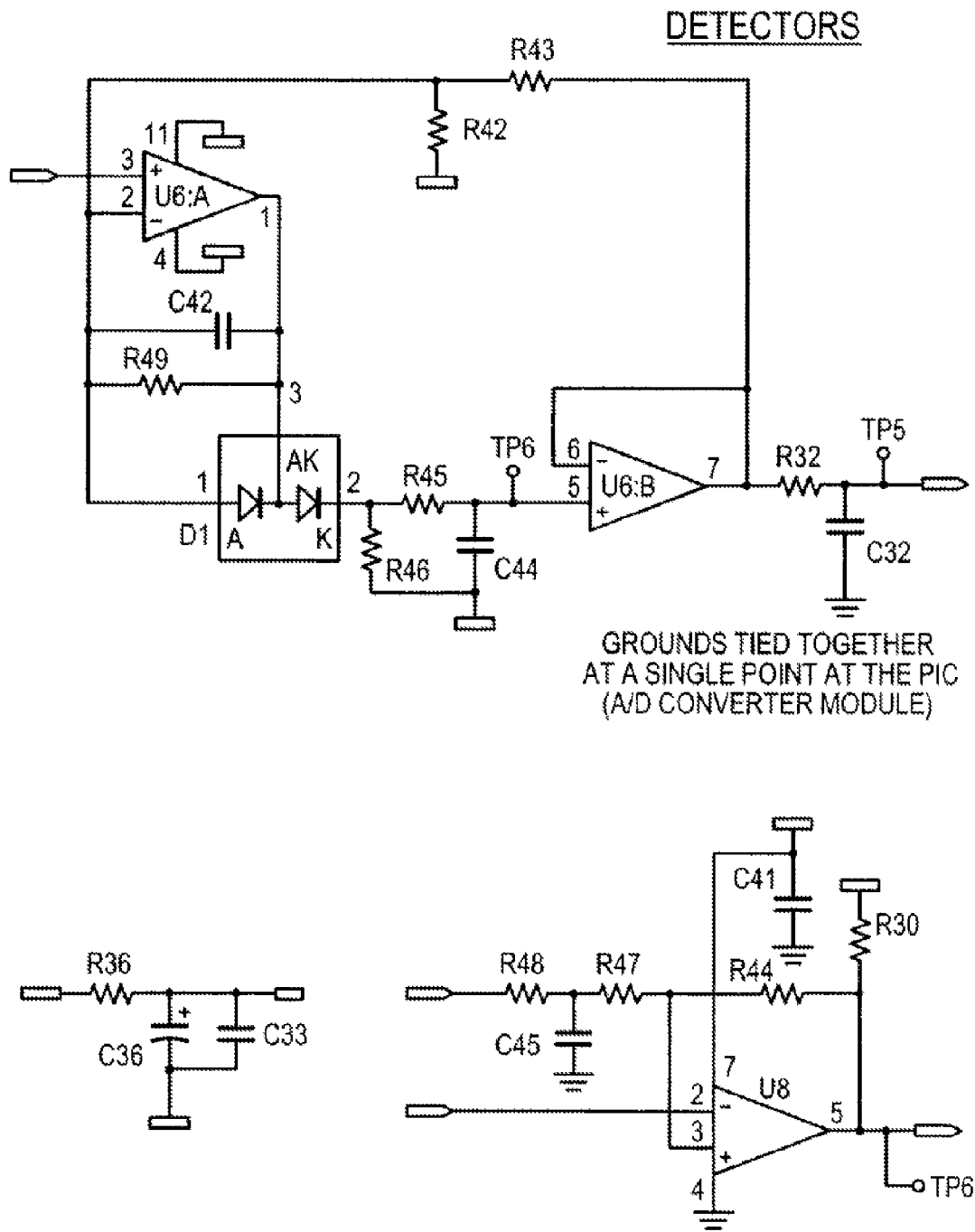

FIG. 13 depicts the two detectors used in the receiver. The first detector is a rectifying, envelope detector with integral voltage gain. This detector is used to strip the modulation frequency and provide the signal envelope to the microcontroller's analog-to-digital converter. The envelope is used the by microcontroller to determine the magnitude of the received signal. The second detector is a voltage comparator, that is used to square up the receive pulses and convert them to CMOS logic level, thereby allowing the microcontroller to extract digital data from the receive signals.

Figure 14:
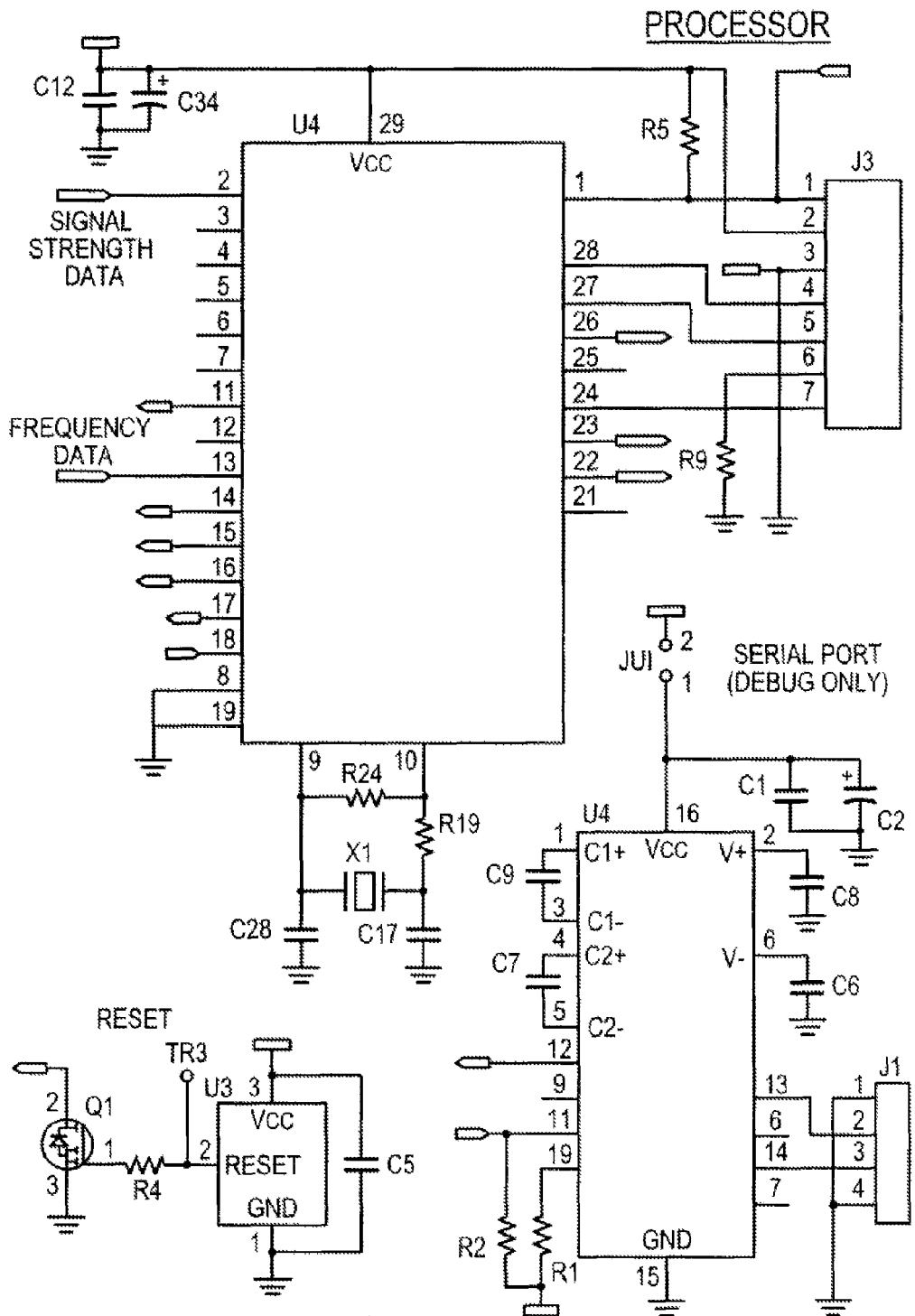

Lastly, FIG. 14 illustrates the microcontroller and its peripherals. The peripherals include a clock oscillator, ICSP port, voltage supervisor/reset generator, and RS-232 level serial port for interfacing with a host personal computer or a main robot processor.

Accordingly, the navigational system is operationally very robust and is adapted to compensate for substantial variances in infrared energy. For example, if the robot is operating in an environment with high base infrared readings (such as a space with a large number of fluorescent lighting fixtures or windows that allow entry of sunlight), the robot distinguishes the infrared signals generated by the transmitter from the infrared noise present in the space. Similarly, the receiver distinguishes between other off-band signals, such as infrared remote controls. In such cases, establishing an initial threshold value of infrared energy and emitting a predefined, known, modulating infrared signal from the transmitter overcomes these disturbances. Additionally, the transmitter can be tuned to emit a sufficiently strong infrared signal to accommodate surfaces with varied reflectivities.

While there have been described herein what are to be considered exemplary and preferred embodiments of the present invention, other modifications of the invention will become apparent to those skilled in the art from the teachings herein. The particular methods, configurations, and geometries disclosed herein are exemplary in nature and are not to be considered limiting.

What is claimed is:

1. An autonomous mobile robot system comprising:
   a transmitter configured to be placed in a transition region between adjacent first and second working areas and comprising an emitter arranged to direct a signal into the first and second working areas, the signal marking the transition region; and
   an autonomous coverage robot configured to operate within the first and second working areas, and comprising:
      a receiving subsystem responsive to the signal directed by the emitter so as to detect the transition region; and
      a drive system configured to
         maneuver the robot over a surface within the first working area in a cleaning mode in which the robot executes a first cleaning behavior and detects the transition region without traversing the transition region; and to then
         maneuver the robot from the first working area to the second working area in a migration mode where the robot detects the transition region and passes through the transition region.

2. The system of claim 1, wherein the transmitter is configured to be positioned within the frame of a doorway between the first and second working areas.

3. The system of claim 2, wherein the transmitter is configured to be placed at the top of the frame of the doorway and to project the signal downward into both the first and second working areas.

4. The system of claim 1, wherein the signal comprises two distinct signals, each of the distinct signals directed in to a respective one of the first and second working areas.

5. The system of claim 4, wherein the receiving subsystem of the robot is configured to distinguish between the distinct signals, the robot being configured to determine which of the working areas the robot is within based on a particular distinct signal.

6. The system of claim 1 further comprising a charging station with which the robot is configured to dock for charging, the robot comprising a controller responsive to a power level of the robot and configured to direct the drive system to the charging station in response to a low power level.

7. The system of claim 6, wherein the controller is configured to direct the drive system to maneuver the robot through the transition region by maneuvering the robot toward the transmitter, and once through the transition region, to maneuver the robot to the charging station.

8. The system of claim 1, wherein the drive system is configured to determine a relative location of the transmitter based on input from the receiving subsystem and is configured to maneuver the robot relative to the transmitter.

9. The system of claim 8, wherein the transmitter further comprises a collimator for focusing and directing the directed signal.

10. The system of claim 1, wherein the directed signal is coded and includes a unique identifier, and wherein the drive system is configured to identify the coded signal from the unique identifier.

11. The system of claim 10, wherein the drive system is configured execute an operating behavior as a function of the identified coded signal.

12. The system of claim 1, wherein the robot comprises a floor cleaner.

13. The system of claim 1, wherein the transmitter has an active mode and a dormant mode and is configured to receive a mode selection signal to switch between the dormant mode to the active mode.

14. The system of claim 13, wherein the robot comprises an emitter disposed on the robot body and configured to emit the mode selection signal.

15. An autonomous mobile robot system comprising:
a transmitter comprising an emitter arranged to direct a signal into a first working area; and
an autonomous coverage robot comprising:
  a receiving subsystem responsive to the directed signal of the emitter; and
  a drive system configured to
    maneuver the robot in a cleaning mode in which the robot continues to execute a first cleaning behavior within the first working area in response to detection of the directed signal by the receiving subsystem; and to
    maneuver the robot in a migration mode in which the robot moves toward the transmitter in response to detection of the directed signal, so as to pass from the first working area through a doorway into a second working area.

16. The system of claim 15, wherein the drive system is configured to maneuver the robot, in the migration mode, to follow the directed signal to pass from the first working area into the second working area.

17. The system of claim 15, wherein the transmitter is positioned in the doorway.

18. The system of claim 15, wherein the drive system is further configured to maneuver the robot, after passing through the doorway, to execute a second cleaning behavior within the second working area.

* * * * *

UNITED STATES PATENT AND TRADEMARK OFFICE
CERTIFICATE OF CORRECTION

PATENT NO. : 9,229,454 B1
APPLICATION NO. : 14/044346
DATED : January 5, 2016
INVENTOR(S) : Mark J. Chiappetta and James Paul Frankel It is certified that error appears in the above-identified patent and that said Letters Patent is hereby corrected as shown below:

In the Specification:

Column 1, line 6, delete "of and" and insert -- of, and --, therefor.

Column 1, line 12, delete "119(c)" and insert -- 119(e) --, therefor.

Column 1, line 14, delete "pan" and insert -- part --, therefor.

Column 1, line 15, delete "heroin" and insert -- herein --, therefor.

In the Claims:

Column 14, line 51, in Claim 4, delete "in to" and insert -- into --, therefor.

Column 15, line 13, in Claim 11, delete "configured" and insert -- configured to --, therefor.

Signed and Sealed this
Fourteenth Day of June, 2016

Michelle K. Lee
*Director of the United States Patent and Trademark Office*